United States Patent
Reddin et al.

(10) Patent No.: US 7,874,166 B2
(45) Date of Patent: Jan. 25, 2011

(54) COOLING AND CLIMATE CONDITIONING SYSTEM FOR A VEHICLE

(75) Inventors: Daniel Reddin, Ottawa (CA); Glen Gallant, Ottawa (CA)

(73) Assignee: Allen-Vanguard Technologies Inc., Ottawa (CA)

( * ) Notice: Subject to any disclaimer, the term of this patent is extended or adjusted under 35 U.S.C. 154(b) by 723 days.

(21) Appl. No.: 11/675,026

(22) Filed: Feb. 14, 2007

(65) Prior Publication Data

US 2007/0193291 A1 Aug. 23, 2007

Related U.S. Application Data

(60) Provisional application No. 60/828,530, filed on Oct. 6, 2006, provisional application No. 60/772,872, filed on Feb. 14, 2006.

(51) Int. Cl.
B60H 1/32 (2006.01)
(52) U.S. Cl. .................. 62/59; 62/244; 62/434
(58) Field of Classification Search ........... 62/239–244, 62/434–435, 506, 185, 59, 389–400; 165/170
See application file for complete search history.

(56) References Cited

U.S. PATENT DOCUMENTS

| | | | | |
|---|---|---|---|---|
| 2,787,129 A | * | 4/1957 | Evans | 62/228.4 |
| 4,294,083 A | * | 10/1981 | King | 62/434 |
| 4,342,202 A | * | 8/1982 | Knutson | 62/243 |
| 5,005,379 A | * | 4/1991 | Brown | 62/434 |
| 5,138,851 A | * | 8/1992 | Mardikian | 62/244 |
| 5,706,883 A | * | 1/1998 | Ward | 165/61 |
| 5,904,052 A | * | 5/1999 | Inoue et al. | 62/244 |
| 6,453,686 B1 | * | 9/2002 | Alden | 62/115 |
| 6,722,147 B2 | * | 4/2004 | Heyl et al. | 62/244 |
| 7,603,874 B2 | * | 10/2009 | Fink et al. | 62/434 |
| 2002/0066552 A1 | * | 6/2002 | Komoda | 165/170 |
| 2003/0164001 A1 | * | 9/2003 | Vouzelaud et al. | 62/244 |
| 2008/0127666 A1 | * | 6/2008 | Major et al. | 62/244 |

* cited by examiner

Primary Examiner—William E Tapolcai
(74) Attorney, Agent, or Firm—Lang Michener LLP

(57) ABSTRACT

A cooling system for a vehicle comprises a compressor for compressing refrigerant, the compressor being adapted to be driven by a power source installed in the vehicle, a condenser for receiving compressed refrigerant from the compressor, an expansion device for expanding refrigerant from the condenser, and a liquid-to-liquid heat exchanger for receiving refrigerant from the expansion device and exchanging heat between the refrigerant and a liquid. The liquid may comprise a coolant, and a pump may be provided for pumping the coolant through the heat exchanger to a point of use such as a cooling garment to cool personnel on board the vehicle. Alternatively, the liquid may be a drinkable liquid which is pumped through the heat exchanger to a suitable dispensing system to provide an on-board supply of cool drinking liquid.

38 Claims, 12 Drawing Sheets

COOLING AND CLIMATE CONDITIONING SYSTEM FOR A VEHICLE

CROSS-REFERENCES TO RELATED APPLICATIONS

This application claims priority from U.S. Provisional Patent Application Ser. No. 60/772,872, filed on Feb. 14, 2006 and from U.S. Provisional Patent Application No. 60/828,530, filed on Oct. 6, 2006, the entire contents of which are hereby incorporated herein by reference.

FIELD OF THE INVENTION

The present invention relates to cooling and climate conditioning systems, and in particular to cooling and climate conditioning systems for vehicles and occupants.

BACKGROUND OF THE INVENTION

Air conditioning systems are often installed in motor vehicles to improve driver and passenger comfort. Typical air conditioning systems comprise elements of a refrigeration system which include a compressor driven by the engine, a condenser, an expansion valve, an evaporator and an accumulator. A blower is provided to blow air over the evaporator and the cooled air is directed into the interior of the vehicle.

When the air conditioning system is operational, it is recommended that the windows, doors and other openings such as sunroofs of the vehicle are closed to isolate the interior of the vehicle from the hotter air outside and reduce the heat load on the air conditioning system. However, in some military and other operational vehicles, it is necessary or desirable to maintain part of the vehicle open to the outside atmosphere. For example, some military vehicles such as tanks and HMMWVs (High Mobility Multi-Wheeled Vehicles) have an opening in the roof, known as a cupola, for accommodating an observer or gunner. The cupola may be provided with one or more vehicle mounted weapon system operated by the observer. Due to the requirement for easy access by the observer to the interior of the vehicle, the cupola remains open during operation, allowing cool air supplied from the air conditioning system to escape quickly from the interior of the vehicle.

In hot climates and without air conditioning, the temperatures inside the vehicle can reach 160° Fahrenheit (F) or more. With the air conditioning system operational, the temperature in vehicles with cupolas is reduced typically to about 110° F., which is still very hot and uncomfortable to endure for long periods of time. Furthermore, in extreme ambient temperatures, the interior of vehicles can become uncomfortably hot, even with all openings closed and the air conditioning full on. Such conditions are not safe for the occupants and may result in elevated core temperatures and harmful thermal stress to the human body.

To mitigate this problem, it has been proposed to provide each occupant of the vehicle with a cooling vest through which a liquid coolant is circulated to provide localized cooling and to maintain core body temperatures within acceptable levels.

In one personal microclimate cooling system developed for military applications, the liquid is circulated through a heat exchanger which is mounted in a cooling duct through which air from the air conditioning system is directed. After passing over the heat exchanger, the air is directed into the interior of the vehicle to provide interior cooling. A schematic of this system is shown in FIG. 1.

Referring to FIG. 1, a conventional vehicle air conditioning system comprises a compressor 5, a condenser 7, an expansion valve 9, an evaporator 11 and an accumulator 13. The evaporator is mounted in a cooling duct 15 through which air is blown to the interior of the vehicle. An air-to-liquid heat exchanger 17 is also mounted in the cooling duct and cools liquid for the cooling jackets with cool air from the evaporator. Air from the heat exchanger is subsequently expelled from the cooling duct directly into the interior of the vehicle to provide interior cooling.

A drawback of this arrangement is that the outlet temperature of liquid from the heat exchanger is typically between 75° F. and 80° F. with an air inlet temperature of 70° F. Thus, the liquid supplied to the cooling jacket for heat exchange is still relatively warm and, since heat transfer rate is dependent on temperature difference, the temperature of the liquid is too high to remove heat from the body at a sufficient rate to achieve the desired cooling and core temperatures. Conventional air conditioning systems are therefore incapable of producing sufficient cooling power to cool a microclimate system such as a liquid cooled vest. Another problem is that the air blown into the interior of the vehicle after performing heat exchange with the liquid, is warmer than normal and is therefore less effective in cooling the interior space. A further drawback is that the heat exchanger presents an impedance to the airflow, which either reduces the airflow to the vehicle interior or requires more power from the blower to maintain the airflow at the same level. Furthermore, the heat exchanger is relatively bulky and takes up a significant amount of space which is typically limited in such vehicles.

In military operations, particularly those in hot, harsh climates (e.g. in desert conditions), the availability of drinking water is essential in maintaining a proper level of hydration to prevent heat injury. Mobile patrol missions can last for extended periods of time, for example up to 18 hours or more. Thus, it is important that the vehicles are stocked before the mission with adequate supplies of drinking water. Typically, a cooler containing water bottles and ice are loaded onto a military vehicle such as a HMMWV, and additional bottles are loaded onto the vehicle and stashed in any available space. While the cooler provides an initial source of relatively cold drinking water, the temperature of the cooler will rise to ambient temperatures once the ice has melted and therefore may reach temperatures of 140° F. or more. The additional bottles stored externally of the cooler will be at similar temperatures. Water at these temperatures is not only unpalatable, but also is not absorbed by the body as easily as cooled water.

SUMMARY OF THE INVENTION

According to the present invention, there is provided an apparatus comprising: a compressor for compressing refrigerant; said compressor being adapted to be driven by a power source of a vehicle; a condenser for receiving compressed refrigerant from the compressor; an expansion device for expanding refrigerant from the condenser; and a liquid-to-liquid heat exchanger for receiving refrigerant from said expansion device and for exchanging heat between said refrigerant and a liquid.

Also according to the present invention, there is provided an apparatus comprising: a compressor for compressing refrigerant, said compressor being adapted to be driven by a power source of a vehicle; a condenser for receiving compressed refrigerant from the compressor; an expansion device for expanding refrigerant from the condenser; and a heat exchanger for receiving refrigerant from said expansion device and for exchanging heat between said refrigerant and a liquid.

Advantageously, this arrangement enables heat to be transferred directly between a liquid and a refrigerant. This allows heat to be transferred more efficiently, allows the liquid to be cooled to lower temperatures and does not consume cool air from the vehicle air conditioning system. Furthermore, as the heat exchanger provides direct heat exchange between the liquid and refrigerant, the heat exchanger can be more compact than the air-to-liquid heat exchanger used in the prior art arrangement, which requires large surface areas for effective heat transfer from the air to the liquid.

In general, the heat exchanger is configured so that the refrigerant and the liquid to be cooled are separated by a thermally conductive solid wall or membrane, the refrigerant being in contact with one side of the membrane and the liquid being in contact with the other side of the membrane. The membrane may comprise the wall of the evaporator, the wall of a conduit for carrying the liquid to be cooled, or the walls of both. In the latter case, the walls may be in intimate thermal contact with each other to enable heat to be transferred effectively from one wall to the other. The membrane may comprise a highly thermally conductive material, such as a metal or metallic material or other thermally conductive material.

In some embodiments, the compressor may be adapted to be driven by the engine of the vehicle or by an electric motor which receives power from an electrical power source of the vehicle. Where the compressor is driven by the engine or motor of the vehicle, the compressor may be coupled to an output drive of the engine or motor. The compressor may include a displacer for compressing the refrigerant and the displacer may be mechanically coupled to the output drive of an engine or motor of the vehicle. The engine may for example comprise a heat engine such as a combustion engine or a motor driven by another energy source, for example an electric motor. In some embodiments, the compressor may include an electric motor for driving the compressor and the electric motor may be adapted to be driven from electricity generated by a generator (e.g. driven by the engine or motor) of the vehicle and/or from stored electrical energy such as energy from a battery or cell. The generator may be used to generate electricity for the vehicle's electrical system, or the generator may be a separate generator. In a hybrid vehicle, the compressor may be coupled to be driven by the engine, the electric motor that drives the wheels, or by a separate electric motor which is powered by the vehicle's electrical system.

In embodiments of the apparatus, the heat exchanger comprises an evaporator for receiving refrigerant from the expansion device, and a supply for supplying liquid adjacent the evaporator. One or more conduits may be provided to carry liquid in heat exchange relationship with the refrigerant. The evaporator and conduit(s) may be disposed in side-by-side relationship, the conduits may be disposed within the evaporator, or the evaporator may be disposed within the liquid carrying conduit(s).

Liquid in heat exchange relationship with the evaporator may be used for any desired purpose. In one embodiment, the liquid may simply comprise a body of liquid in a container with the evaporator at least partially or fully immersed in the liquid. In another embodiment, the supply may comprise a flow of liquid which flows in heat exchange relationship with the refrigerant for supply to one or more points of use. In some embodiments, the liquid may be caused to flow in a closed loop or a loop which may be controllably opened and closed.

In embodiments of the apparatus, the heat exchanger has one or more outlet ports for supplying liquid therefrom. One or more heat exchange devices may be connected to the heat exchanger for receiving liquid coolant, and in some embodiments, at least one heat exchange device comprises a garment for passing liquid coolant adjacent the body of a wearer for cooling thereof.

Embodiments of the apparatus may include a pump for pumping liquid through the heat exchanger. A controller may be provided for controlling operation of the pump in response to a parameter of the refrigerant. The parameter may be based on pressure and/or temperature of the refrigerant, and/or temperature and/or pressure of the liquid.

In some embodiments, one or more components of the apparatus may be shared by an air conditioning system of the vehicle to reduce the number of components required, thereby saving space, installation and maintenance costs and improving reliability. For example, any one or more of the compressor and condenser can be used in an air conditioning system of the vehicle. Some embodiments include an accumulator between the evaporator and the compressor and the accumulator can also be shared with an air conditioning system. Some embodiments include a receiver or accumulator between the condenser and expansion valve of the apparatus, which may be shared by the air conditioning system.

In other embodiments, one or more components of the cooling system may be separate from those used in a vehicle air conditioning system. For example, any one or more of the compressor, the condenser, the expansion valve, the evaporator and the accumulator may be separate from the vehicle air conditioning system. Advantageously, having one or more separate components from the air conditioning system provides redundancy, so that if one component fails, the cooling system may continue to operate. For example, the cooling system may have its own compressor, separate from an air conditioning system compressor. If the air conditioning compressor fails, the cooling system can still operate. This arrangement of one or more separate components for the cooling system assists in enabling the cooling system to be operated independently of an air conditioning system, may facilitate retrofitting the system to existing vehicles, and allows the components to be individually sized to the system requirements.

In some embodiments, the apparatus further comprises supply means for supplying the liquid to the heat exchanger for exchanging heat with the refrigerant. The liquid may comprise a drinkable liquid such as water or other consumable beverage, or any other liquid.

In some embodiments, the supply means comprises one or more storage container(s) for storing the liquid. One or more storage container may comprise a variable volume chamber for containing the liquid. For example, the container may comprise a flexible wall for varying the volume of the chamber.

In some embodiments, the supply means is adapted to produce a flow of drinkable liquid through the heat exchanger in heat exchange with the refrigerant, and may comprise a pump.

In some embodiments, the apparatus further comprises a reservoir for receiving the liquid from the heat exchanger. Advantageously, the provision of a reservoir enables a supply of cooled liquid to be prepared in advance of its demand. This allows the opportunity for liquid to be cooled by the refrigerant at a selected time which is independent of when liquid is required to be dispensed from the system. This allows the liquid to be cooled to lower temperatures or for the cooling system to be operated at particular times when, for example, the demand for refrigerant in other applications such as air conditioning or localized climate conditioning is less or more power to drive the cooling system is available.

In some embodiments, the apparatus further comprises return means for returning liquid from the reservoir to the heat exchanger for heat exchange with the refrigerant. Advantageously, this arrangement allows liquid to be circulated from the reservoir back to the heat exchanger for re-cooling or additional cooling, and then returned to the reservoir. Thus, the combination of the reservoir and return means allows the liquid to be cooled to lower temperatures than might otherwise be achieved by passing the liquid through the heat exchanger once, and reduces the cooling power required to achieve these lower temperatures. This may be particularly beneficial for vehicle applications, where available power is limited and/or, for example, where the refrigerant is shared between the air conditioning system and the liquid cooling system.

In another embodiment, either with or without a return path between the reservoir and heat exchanger, the flow of liquid through the heat exchanger may be varied, so that, for example, when the reservoir is being charged but there is no demand for liquid therefrom, the flow rate of liquid through the heat exchanger is reduced to lower the temperature further, and the flow may be increased, where liquid is dispensed from the reservoir to attain the required dispensing rate.

In some embodiments, the return means comprises a pump coupled between an outlet of the reservoir and an inlet of the heat exchanger.

In some embodiments, the apparatus further comprises a controller for controlling the pump. The controller may be adapted to control the pump based on one or more of a parameter indicative of temperature of the liquid and a parameter indicative of the pressure of the liquid. For example, the parameter may be indicative of the temperature of liquid in the reservoir. The controller may be adapted to operate the pump to cause liquid to flow from the reservoir through the heat exchanger and back to the reservoir when the temperature of the reservoir is above a predetermined value, and to cease operation of the pump when the temperature of liquid in the reservoir reaches or falls below a predetermined value. The two predetermined values may be the same or different values. In some embodiments, the controller may comprise a temperature sensitive switch.

In some embodiments, the apparatus further comprises a valve between the outlet of the reservoir and the inlet of the pump. In some embodiments, the inlet of the pump is connected to the storage container. Advantageously, the provision of a valve in the return path enables liquid to be drawn from the storage container in preference to the return path to enable air to be purged from the various components of the system through the dispensing port (or bleed hole), for example, without being returned to the pump. The valve may, for example, comprise a pressure sensitive valve such as a check valve which only opens at or above a predetermined pressure. Once the system has been charged with liquid, the valve is operative to control from which source liquid is introduced into the pump as between the storage container and return path.

Advantageously, the pressure sensitive (PS) valve provides a means of automatically controlling the source of liquid to the pump, in the sense that it does so without user's knowledge or intervention and without the need for any sensing within the unit. The PS valve is adapted only to open at or above a predetermined pressure difference. When the dispensing valve is open, the pressure difference across the PS valve is less than the predetermined pressure difference, and the PS valve is closed so that liquid is drawn from the storage container. When the dispensing valve is closed, the pressure difference increases to a point where the PS valve automatically opens to allow liquid to flow through the return path.

In some embodiments, the apparatus further comprises a thermal insulator for thermally insulating the reservoir. The thermal insulator may comprise a vacuum chamber around the reservoir and/or thermal insulating material.

According to another aspect of the invention, there is provided a heat exchange module for a vehicle comprising a heat exchanger defining a first flow path adapted for connection to a supply of refrigerant provided in a vehicle and a second flow path for carrying liquid in heat exchange relationship with said first flow path, and a pump for pumping liquid through said second flow path.

In some embodiments, the module comprises a coupling for releasably coupling the second flow path to a heat exchange garment. The coupling may comprise one or more auto-release quick disconnect fluid coupler(s) that disconnect at a predetermined tensile force such as a force that would occur if an occupant wearing the garment were to flee from the vehicle without manually disconnecting it.

According to another aspect of the present invention, there is provided an apparatus comprising heat exchange means for exchanging heat between a fluid and a liquid; a storage container for supplying said liquid to said heat exchange means; a reservoir for receiving said liquid from said heat exchange means after heat exchange with said fluid; and a valve for dispensing said liquid from said reservoir.

In some embodiments, the apparatus further comprises return means for returning the liquid from the reservoir to the heat exchange means. Advantageously, the ability to return liquid to the heat exchange means allows the liquid to be cycled through the heat exchange means a number of times, so that the required cooling need not be done in a single pass. This reduces the heat load on the heat exchange means, which is particularly beneficial if the available cooling power is limited.

In some embodiments, the return means includes a pump connected between an outlet of the reservoir and an inlet of the heat exchange means.

In some embodiments, the apparatus further comprises a controller for controlling the return of liquid from the reservoir to the heat exchange means. For example, the controller may be adapted to control the return of liquid from the reservoir based on a parameter indicative of the temperature of the liquid, for example, the temperature of liquid in the reservoir. The controller may be adapted to control a length of time the liquid circulates between the heat exchanger and reservoir. The length of time may be based on the temperature of the liquid. The controller may be adapted to repeatedly cycle liquid from the reservoir to the heat exchanger for cooling thereof and from the heat exchanger means back to the reservoir, until the temperature of the liquid reaches a predetermined value.

In some embodiments, the pump has an inlet and the return means and storage container are both connected to the pump inlet.

In some embodiments, the apparatus further comprises a second controller for controlling flow of liquid to the inlet of the pump from the return means and from the storage container. The second controller may for example comprise a valve. The valve may be positioned in the return path between the reservoir and the pump inlet, but not between the storage container and the pump inlet.

In some embodiments, the heat exchanger means comprises a chamber having a top and a bottom, and an outlet for discharging liquid to the reservoir, the outlet being positioned adjacent or proximate the top of the chamber. Advantageously, this arrangement assists in preventing air being trapped inside the chamber, which is more likely to occur if the outlet is positioned near the bottom of the chamber.

In some embodiments, the reservoir comprises a chamber for holding the liquid, the chamber having a top and a bottom and an outlet for discharging liquid from the chamber, wherein the outlet is positioned adjacent or proximate the top of the reservoir chamber. Advantageously, this arrangement assists in reducing the possibility of air being trapped inside the chamber which would promote bacterial growth.

In some embodiments, the heat exchange means comprises an evaporator for receiving and exchanging heat with the liquid to be cooled. The heat exchanger may comprise a membrane or wall for transferring heat between the liquid and refrigerant. The membrane may comprise the wall of the evaporator, or of a conduit or chamber for carrying the liquid to be cooled or comprise both walls. The heat exchanger may have any configuration or feature(s) described herein.

In some embodiments, the evaporator has an inlet and an outlet and releasable coupling means coupled to at least one or both of the inlet and the outlet for releasably coupling the evaporator to a fluid conditioning system. Advantageously, this enables the liquid cooling unit to be readily connected and disconnected to a fluid conditioning system, for example a system installed in a vehicle. In some embodiments, an expansion device is coupled to the evaporator, and a releasable coupling is connected to the expansion device to connect the apparatus to a fluid conditioning system. Alternatively, or in addition, a releasable coupling may be positioned between any other components of the fluid conditioning system.

In some embodiments, the apparatus further comprises a fluid conditioning system for conditioning the fluid for the evaporator.

In some embodiments, the fluid conditioning system comprises any one or more of a compressor for compressing the fluid, a condenser for receiving compressed fluid from the compressor, and an expansion device for expanding fluid from the condenser and for introducing the fluid into the evaporator.

In some embodiments, the compressor comprises a displacer for compressing the fluid, and which is coupled to a driveshaft mechanically driven by the engine of a vehicle.

In some embodiments, the apparatus further comprises one or more additional evaporators coupled to receive fluid from the compressor.

In some embodiments, the apparatus further comprises a fluid impeller for producing a flow of fluid adjacent an additional evaporator. The fluid impeller may comprise, for example, an air blower or a pump for pumping liquid.

According to the present invention, there is further provided a method of heat exchange between fluids comprising the steps of: compressing refrigerant by means of a compressor driven from a power source of a vehicle; and exchanging heat between refrigerant from said compressor and a liquid.

In one embodiment, the liquid is in the liquid state before exchanging heat with said refrigerant.

According to the present invention, there is further provided a vehicle comprising a body having an interior space; a power source; a compressor for compressing refrigerant, said compressor being adapted to be driven by said power source, and a heat exchanger having an evaporator arranged to pass said refrigerant adjacent a liquid for heat exchange therewith.

According to the present invention, there is further provided an apparatus comprising a heat exchanger for exchanging heat between a fluid and a liquid; a reservoir for receiving said liquid from said heat exchanger after heat exchange with said fluid; and a valve for dispensing said liquid from said reservoir.

According to the present invention, there is further provided a vehicle comprising an air conditioning system, the air conditioning system comprising a supply of refrigerant, an evaporator, means for causing refrigerant from the supply to flow through said evaporator, means for causing air to flow in heat exchange relationship with said evaporator, said vehicle further comprising a further evaporator, and supply means for supplying liquid in heat exchange relationship with said further evaporator, said further evaporator being coupled to receive refrigerant supplied by said refrigerant supply.

According to the present invention, there is further provided an apparatus comprising a heat exchanger for exchanging heat between a fluid and a liquid, supply means for supplying liquid to said heat exchanger, and a return path for returning liquid that has passed through said heat exchanger back to said heat exchanger for heat exchange with said fluid. A dispensing valve may be provided for dispensing liquid that has passed through said heat exchanger.

According to the present invention, there is further provided an apparatus comprising a heat exchanger, a receiver for receiving liquid from the heat exchanger, a dispensing valve for dispensing liquid that has passed through the heat exchanger, and a controller adapted to vary the flow rate of liquid through the heat exchanger between different rates, each rate being such that fluid flows through the heat exchanger.

BRIEF DESCRIPTION OF THE DRAWINGS

Examples of embodiments of the present invention will now be described with reference to the drawings, in which.

DETAILED DESCRIPTION OF THE PREFERRED EMBODIMENTS

Figure 1:
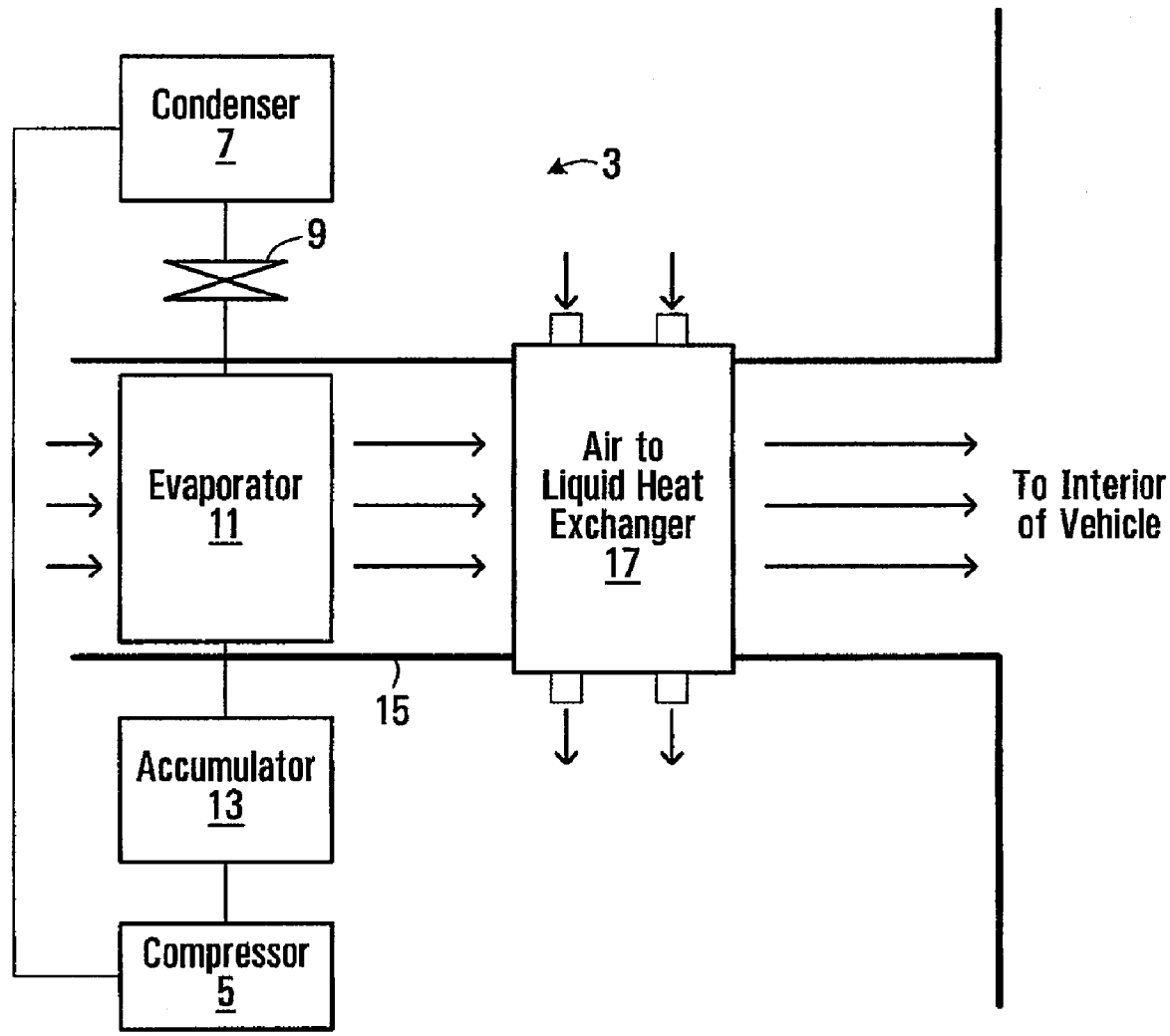
FIG. 1 shows a schematic diagram of an air conditioning system according to the prior art.
Figure 2:
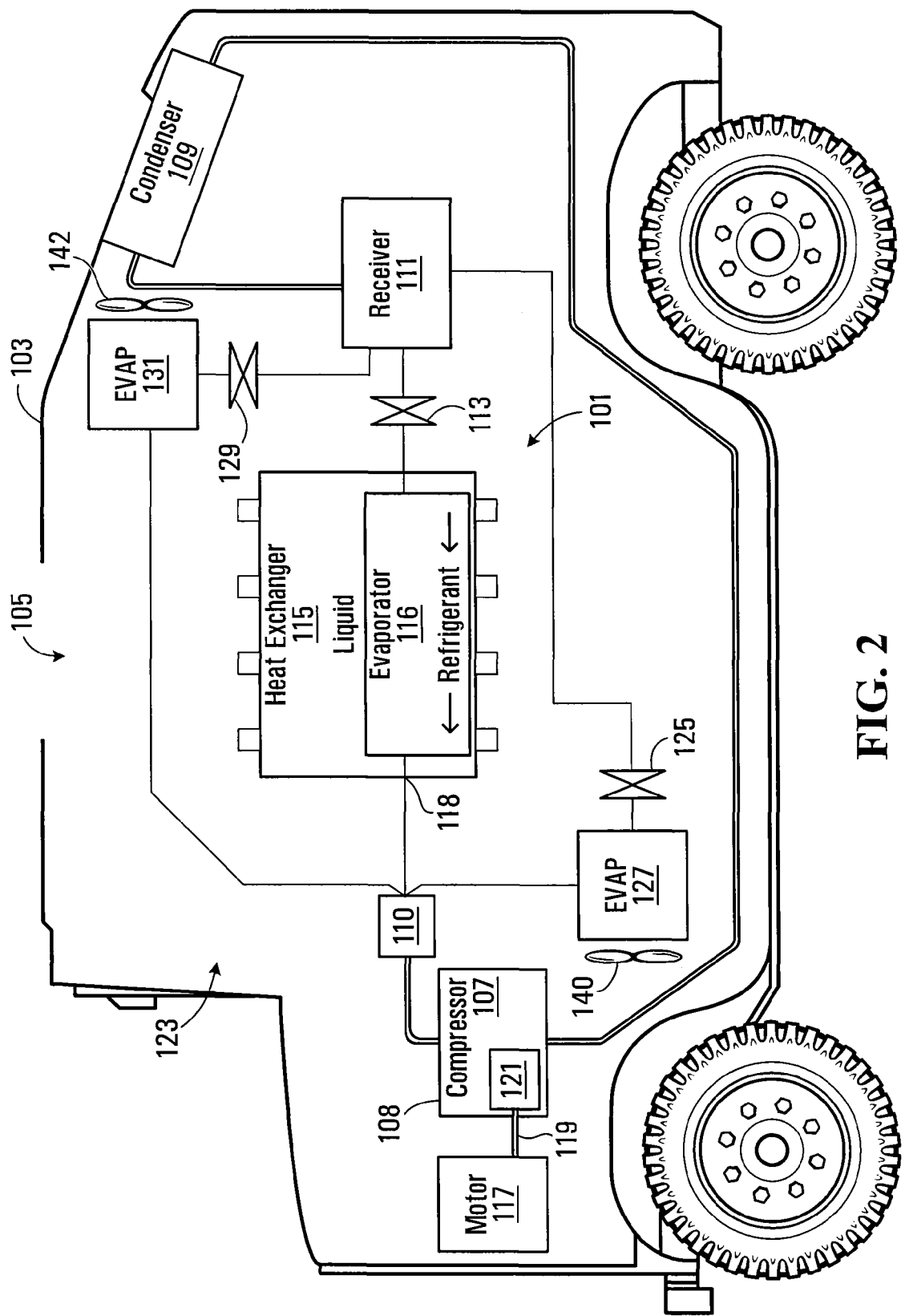
FIG. 2 shows a schematic diagram of a climate conditioning system according to an embodiment of the present invention.

Referring to FIG. 2, a climate conditioning system according to an embodiment of the present invention, generally indicated at 101 is installed in a vehicle 103. In this example, the vehicle comprises a land vehicle which is adapted for military application and includes a cupola 105 formed in the roof of the vehicle for accommodating a person at an elevated position. The climate conditioning system may be installed in any vehicle, including, but not limited to, land based vehicles, watercraft such as boats, ships or submarines, and aircraft including fixed wing aircraft and helicopters, and with or without an air conditioning system.

The climate conditioning system comprises a compressor 107 for compressing refrigerant, a condenser 109 for receiving refrigerant from the compressor, an optional receiver 111 for receiving refrigerant from the condenser, an expansion device 113 for expanding refrigerant from the receiver and a heat exchanger 115 for exchanging heat between refrigerant and a liquid coolant. The heat exchanger includes an evaporator 116 for receiving the refrigerant and cooling the liquid coolant which may be in direct thermal contact with the evaporator wall. The output 118 of the evaporator is connected to the input 108 of the compressor via an optional accumulator 110 for reducing or preventing liquid refrigerant from the evaporator, if any, entering the compressor.

A motor 117, which drives motion of the vehicle, has one or more output drives 119, and an output drive 119 of the motor 117 is coupled to drive the compressor 107. In this particular embodiment, the output drive 119 comprises a rotary driveshaft which is coupled by any suitable means, for example, which may include a belt and pulley system and/or a clutch mechanism, to a fluid displacer 121 of the compressor, for compressing refrigerant returned from the heat exchanger 115. The motor 117 may comprise any form of motor installed in the vehicle such as a combustion engine, electric motor or hybrid.

In this embodiment, the vehicle is optionally equipped with an air conditioning system for providing conditioned air into the interior space 123. The air conditioning system includes one or more expansion device(s) and evaporator unit(s) 127, 131 which are connected to receive refrigerant from the receiver 111. One or more blowers (e.g. fans), 140, 142, are provided to blow air over the evaporator(s) 127,131 and the cool air is then directed into the interior of the vehicle in a conventional manner.

Advantageously, in the embodiment shown in FIG. 2, a number of components required by the climate conditioning system and air conditioning system are shared, thereby reducing the number of components required, and saving both space and cost. In particular, both the climate conditioning and air conditioning circuits share the same compressor, the same condenser, receiver and accumulator. Each circuit has its own expansion device and evaporator, which allows these components to be positioned and controlled individually and independently. In other configurations, the air conditioning system may have one or more of its own compressor, its own condenser and its own accumulator.

Figure 3A:
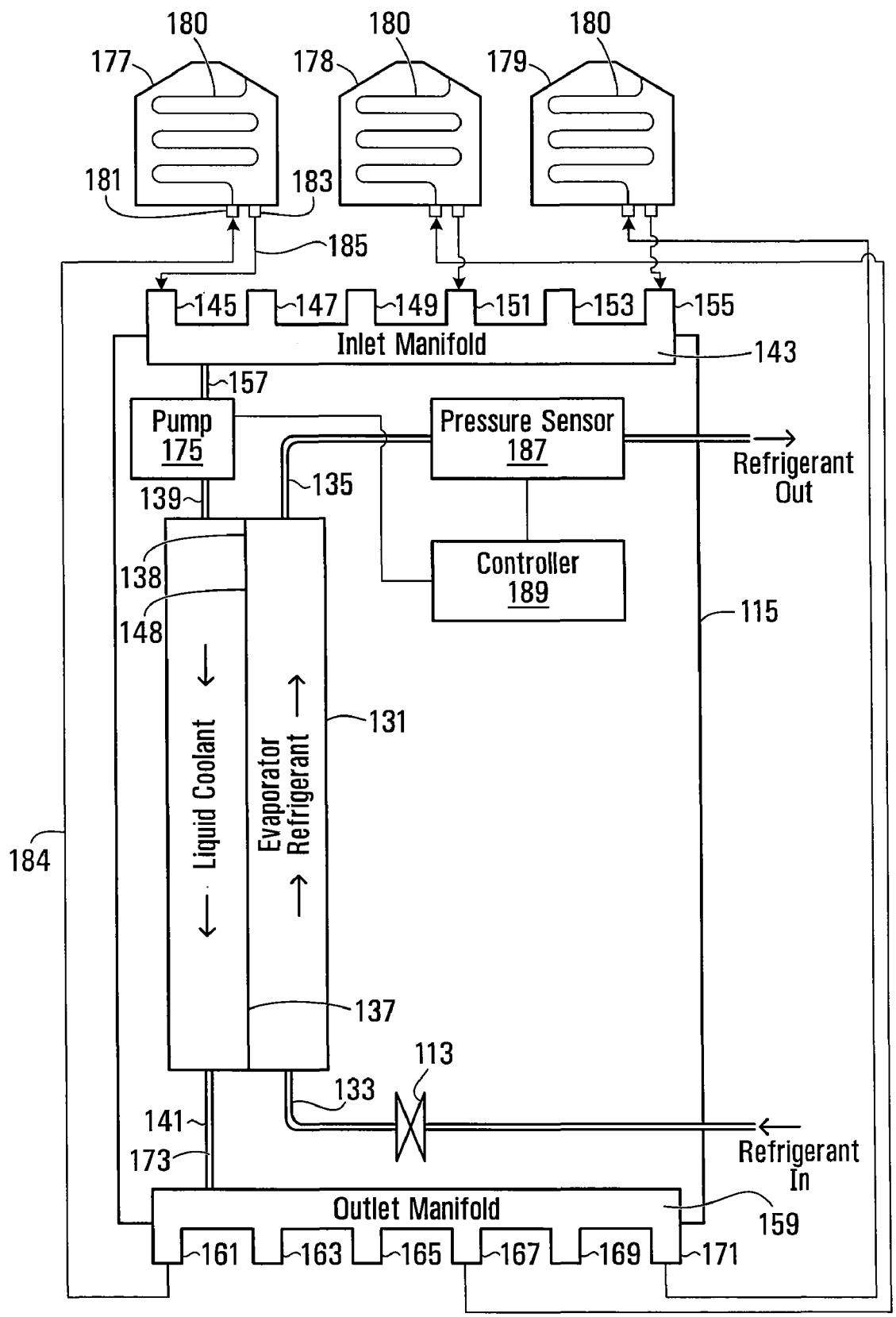
FIG. 3A shows a more detailed schematic diagram of a climate conditioning system according to an embodiment of the present invention.

An embodiment of the heat exchanger 115 and an example of a use thereof is shown in more detail in FIG. 3A.

Referring to FIG. 3A, an embodiment of the heat exchanger 115 comprises an evaporator 131 having an inlet 133 and an outlet 135, a conduit 137 adjacent the evaporator for carrying fluid in heat exchange relationship with the evaporator and having a fluid inlet 139 and a fluid outlet 141, an inlet manifold 143 having a plurality of inlet ports 145, 147, 149, 151, 153, 155 and an outlet port 157 connected to the inlet 139 of the conduit 137, an outlet manifold 159 comprising a plurality of outlet ports 161, 163, 164, 167, 169, 171 and an inlet port 173 connected to the outlet 141 of the conduit 137, and a pump 175 for pumping fluid through the conduit 137 between the inlet and outlet manifolds.

The evaporator may have any desired configuration and typically comprises a conduit of any desired cross-sectional geometry and area for carrying refrigerant fluid therethrough. The evaporator may comprise either a single conduit or a plurality of conduits arranged in parallel. The conduit 137 and the evaporator 131 are positioned to enable heat to be transferred between the refrigerant in the evaporator and fluid in the conduit 137. The heat exchanger includes a wall or membrane 138 for separating the refrigerant from the liquid to be cooled and enabling heat to be transferred between the refrigerant and liquid which respectively contact opposed sides 146,148 of the membrane 138. The membrane may comprise a single wall, e.g. of the evaporator or wall of the conduit carrying the liquid to be cooled, or the membrane may comprise the walls of both. In the latter case, the walls may be in intimate thermal contact with each other (e.g. in direct contact) and may, for example, be welded or soldered together, or otherwise held together, optionally through a thermally conductive agent.

The membrane may comprise a highly conductive material such as a metal or metallic material or other thermally conductive material.

In one configuration, the evaporator and conduit may be placed side-by-side and their respective walls placed in contact with one another or otherwise thermally connected to one another to allow heat to be transferred therebetween. In another configuration, the conduit 137 may be placed within the evaporator conduit over part or all of its length. Alternatively, the evaporator may be placed within the conduit 137 over part or all of its length. Alternatively, the conduit may be placed within the evaporator over part of its length and the evaporator may be placed within the conduit over another part of its length. These configurations may assist in increasing the efficiency of heat transfer between the liquid and refrigerant. The evaporator and/or conduit may be linear or non-linear, for example, coiled or spiral, serpentine, zig-zag or any other configuration. Advantageously, non-linear configurations can reduce the overall dimensions of the evaporator/conduit combination. The evaporator and/or conduit may be provided with structure to increase the efficiency of heat transfer between the fluid and refrigerant. This structure may include fins or other formations which increase the surface area of the evaporator and/or conduit which is in contact with the respective fluid passing therethrough.

Figure 3B:
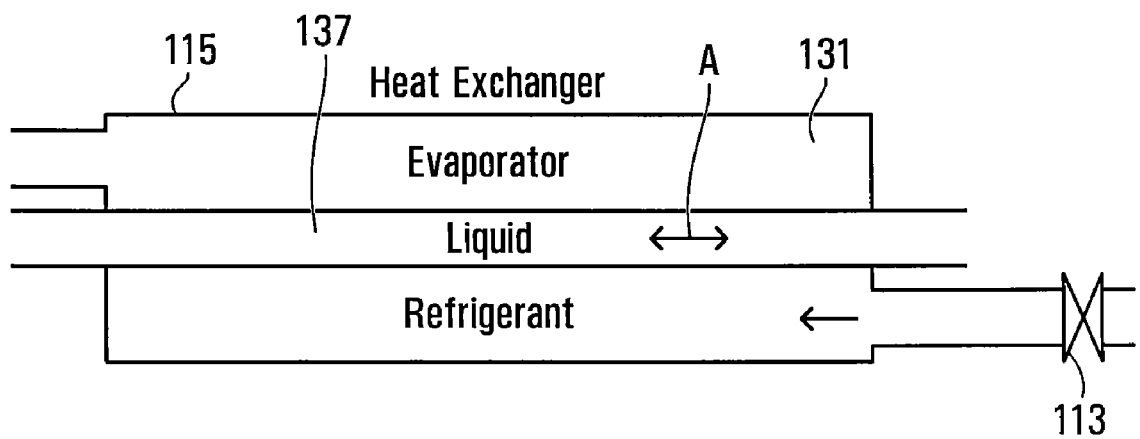
FIG. 3B shows a schematic diagram of a heat exchanger according to an embodiment of the invention.

FIG. 3B shows a schematic diagram of an embodiment of a heat exchanger for use in embodiments of the apparatus. The conduit 137 for carrying liquid to be cooled is enclosed within the evaporator 131. Thus, in use, refrigerant surrounds the liquid and is in contact with the walls of the conduit on all sides. Refrigerant is introduced into the evaporator through the expansion device 113 and liquid in the conduit may be arranged to flow in either direction as indicated by the arrow A. The conduit may be linear, for example as illustrated, or non-linear.

Figure 3C:
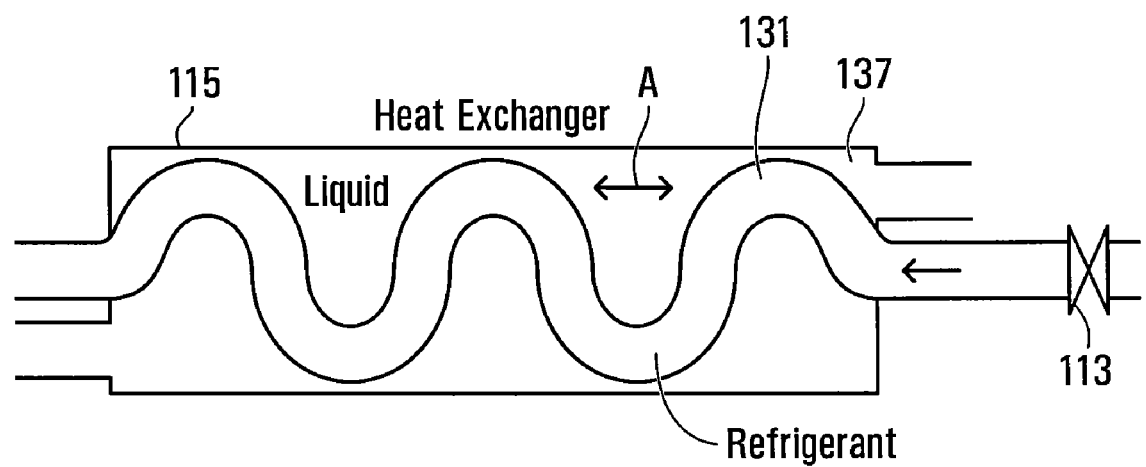
FIG. 3C shows a schematic diagram of a heat exchanger according to another embodiment of the invention.

FIG. 3C shows a schematic diagram of another embodiment of a heat exchanger for use in embodiments of the apparatus. In this embodiment, the evaporator 131 is enclosed within the conduit or chamber 137 for carrying liquid. Although the evaporator may comprise a linear conduit as for FIG. 3B, the arrangement of FIG. 3C, the evaporator conduit has a serpentine configuration, and in other embodiments may have a spiral configuration or other non-linear configuration. Again, refrigerant is introduced into the evaporator through the expansion device 113 and liquid in the chamber or conduit 137 may flow in either direction as indicated by arrow A.

Returning to FIG. 3A, the inlet and outlet manifolds allow the heat exchanger to be connected to a plurality of devices which require a supply of fluid at a controlled temperature. FIG. 3 shows a plurality of cooling jackets connected to the heat exchanger to be worn by personnel carried by the vehicle to maintain their body temperatures within acceptable levels. Each cooling jacket 177, 178, 179 comprises front and/or rear torso portions of a suitable fabric or cloth material and one or more conduits 180 attached to the front and rear portions to provide a fluid path between the inlet and outlet ports 181, 183. Each inlet port 181 is connected to a respective outlet port of the outlet manifold 159 via a supply hose 184 and each outlet port 183 is connected to a respective inlet port of the inlet manifold 143 via a return hose 185. A quick release connector system (or other releasable connector) may be provided for each cooling jacket to allow the jacket to be released from the heat exchanger. The quick release system may be placed at any suitable position, for example, at one or both ends of the flexible fluid line or hose between the jacket and heat exchanger.

In operation, when cooling is required, the vehicle personnel put on a cooling vest, if this has not already been done, and connect the inlet and outlet ports of the cooling vest to the heat exchanger. The pump 175 can then be activated to pump liquid cooled by the evaporator through the jacket. Having absorbed body heat, coolant from the jacket is returned to the heat exchanger and the cycle is repeated.

It will be appreciated that cooling jackets are only one form of garment with which the climate heat exchanger 115 can be used. Other cooling garments may have any other desired format for cooling one or more parts of the body and such garments may include those which can be worn on the arms, legs, hands, feet, head or any part thereof. The heat exchanger may be adapted to accommodate connection of only one cooling garment thereto, or may provide any other number of connectors to allow simultaneous connection of any number of cooling garments or other devices thereto.

Cooling fluid from the heat exchanger may be applied to any other application. For example, the cooling fluid could be used to maintain a cool supply of drinking liquid such as water, other beverages or food products for consumption by personnel being carried by the vehicle to provide additional cooling, refreshment and improved comfort, particularly over long journeys and/or in hot or extreme climates.

Other uses for cooling fluid from the heat exchanger may include, but are not limited to, cooling other equipment carried by the vehicle such as electrical equipment or other equipment whose efficiency or operation suffers or fails at high temperatures, human interfaces which would otherwise be uncomfortable or too hot to touch, and additional cooling for the engine or components thereof.

Returning to FIG. 3, the heat exchanger 115 may include one or more sensors for monitoring operation of the heat exchanger and a controller for controlling operation thereof. In the embodiment of FIG. 3, a pressure sensor 187 is positioned at the outlet of the evaporator to measure the pressure difference between the outlet of the evaporator and the inlet to the compressor (or accumulator 110). A low-pressure difference may be indicative of a lower than desirable temperature in the evaporator which could cause freezing of the coolant carried by the conduit 137. A controller 189 may be provided to control operation of the pump 175 in response to the pressure difference measured by the pressure sensor 187 to shut off or otherwise control the speed of the pump to prevent freezing.

The coolant may comprise any suitable liquid, for example water either with or without an antifreeze additive (e.g. glycol) or any other liquid possibly with a low freezing point, i.e. a freezing point below 0° C. The wall(s) of the heat exchanger through which heat is exchanged between the refrigerant and coolant preferably comprise a good thermally conductive material such as a metal or other good thermal conductor, as mentioned above.

The heat exchanger pump 175 may comprise any suitable pump such as a rotary or reciprocating pump.

In other embodiments, the heat exchanger may include a single inlet port and a single outlet port rather than a manifold arrangement having multiple ports. In other embodiments, the heat exchanger may have any number of fluid inlet/outlet ports.

Figure 4:
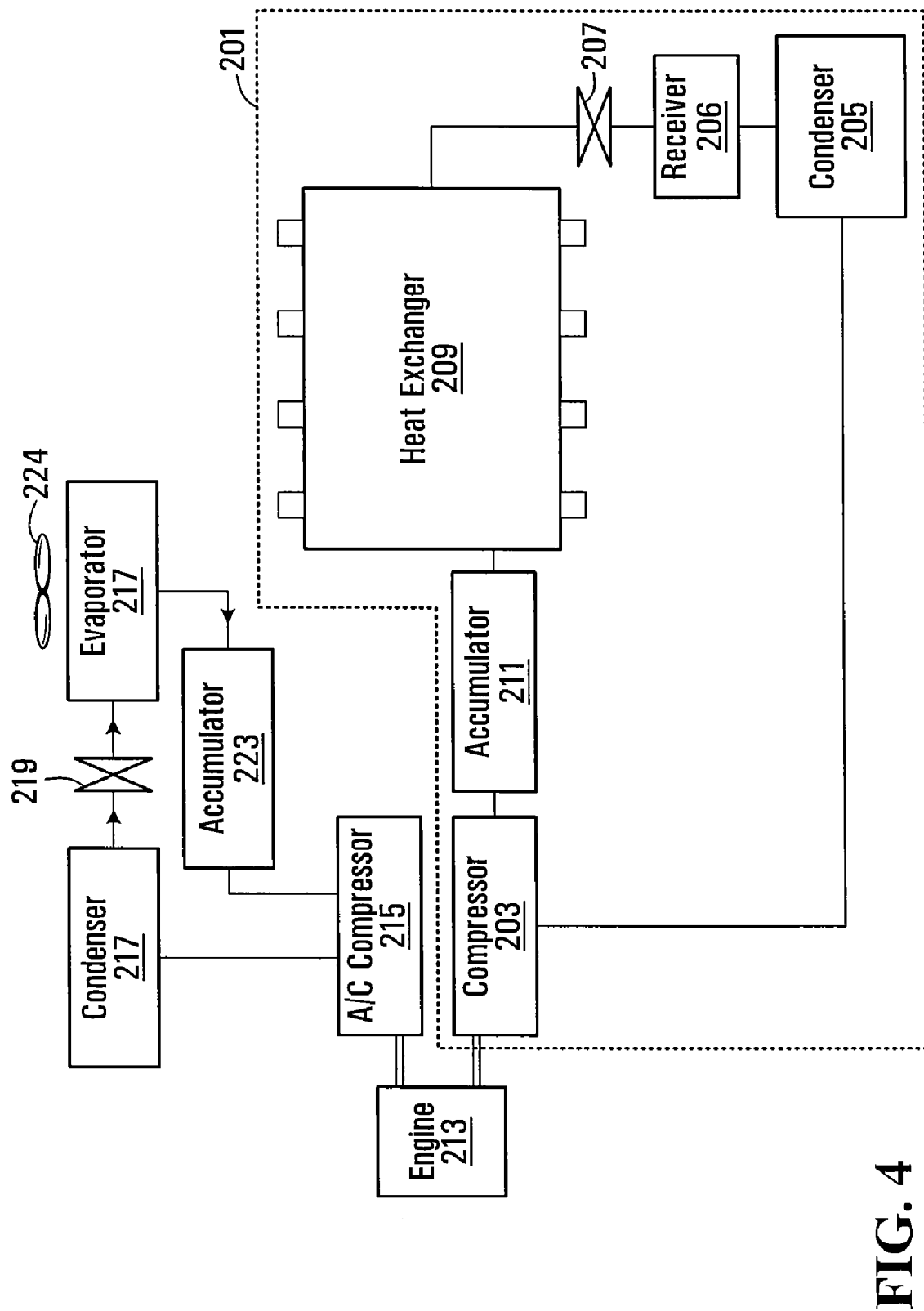
FIG. 4 shows a schematic diagram of a climate conditioning system according to another embodiment of the invention.

FIG. 4 shows an example of an embodiment of the climate conditioning system in which components of the system are separate from an air conditioning system installed in a vehicle. Referring to FIG. 4, the climate conditioning system 201 comprises a compressor 203, a condenser 205, an optional receiver 206, an expansion valve 207, a heat exchanger 209 and an optional accumulator 211. The compressor 203 is coupled to an engine or motor 213 of a vehicle, the engine typically, but not necessarily being used to drive motion of the vehicle. The compressor 203 is coupled to an output drive of the motor by any suitable means and may be arranged in such a manner that the compressor can be decoupled from the output drive (for example, by a clutch or other mechanism) so that the compressor 203 need only be coupled when the climate cooling system is required.

The heat exchanger 209 may be similar to any heat exchanger described herein and is typically adapted to provide heat transfer between the refrigerant of the cooling system and a liquid. The liquid may be used to provide cooling for one or more cooling garments and the liquid may be circulated through the cooling garment(s) by means of a pump. Conveniently, the heat exchanger and cooling garment may be connected in a closed circuit so that liquid is recirculated between the two.

In the embodiment of FIG. 4, the vehicle also includes a conventional air conditioning system which includes a compressor 215, separate from the compressor 203, a condenser 217 an expansion valve 219, an evaporator 221 and an optional accumulator 223. A fan 224 is provided for blowing air across the evaporator 221. The air conditioning compressor 215 is also coupled to an output drive of the engine 213. The compressors may be arranged so that they can be driven independently to enable the cooling system and air conditioning system to be operated independently. Advantageously, by providing a separate compressor for the climate conditioning system 201, cooling of personnel within the vehicle can still be effected if the air conditioning system fails. Furthermore, the compressor for the climate control system can be sized to match the heat load for which the system is designed.

In other embodiments, any one or more of the components of the climate conditioning system may be shared with the air conditioning system.

Where embodiments of the cooling system are used with one or more cooling garments, the cooling garments may be detachably connected to the heat exchanger using a quick release system. In one embodiment, the quick release system enables the cooling garment to be completely detached from the heat exchanger when the tension between the two exceeds a predetermined value. This allows personnel to evacuate the vehicle rapidly without the need to manually disconnect the cooling garment from the heat exchanger. The act of leaving the vehicle will automatically release the cooling garment from the vehicle mounted cooling system. An example of an embodiment of a quick release mechanism is shown in FIG. 5.

Figure 5:
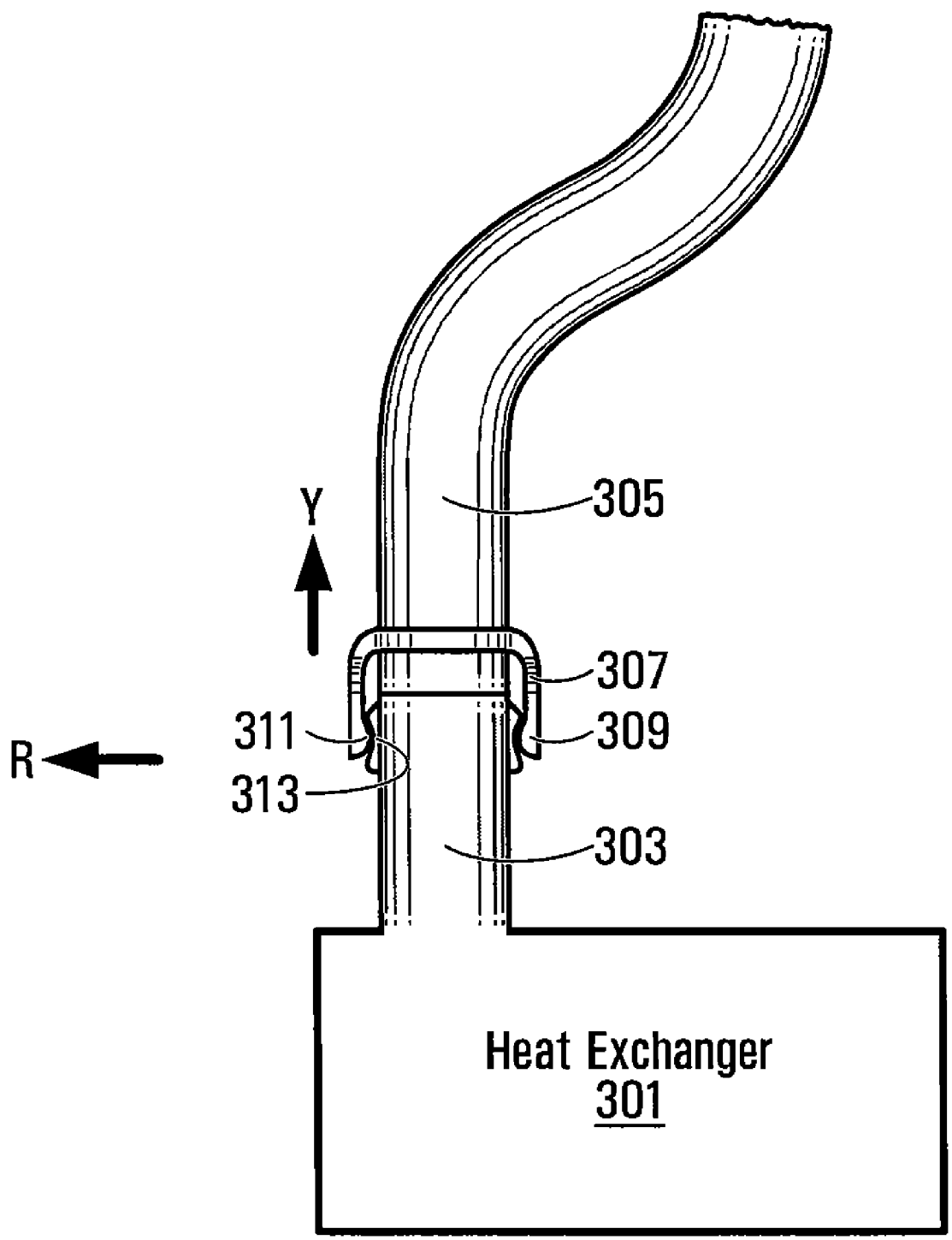
FIG. 5 shows a fluid line release mechanism for use in embodiments of the invention.

Referring to FIG. 5, a heat exchanger 301 has a liquid inlet or outlet port 303 which is releasably connected to a fluid line or hose 305 for carrying liquid between the heat exchanger and a cooling garment (not shown). A quick release mechanism is provided to couple the fluid port 303 to the hose 305. In this embodiment, the quick release mechanism 307 comprises one or more resilient arms 309 having a protrusion 311 which sits in a recess 313 to fasten the hose to the fluid port. When tension is applied between the heat exchanger and fluid line in the direction of the arrow Y, the resilient arms 307 are forced outwardly in the direction of arrow R, and the fluid line is released. In this embodiment, the resilient arms 307 are provided on the hose and the recesses 313 are provided on the fluid port 303. In other embodiments, the resilient arm(s) may be provided on the fluid port and the recess(es) provided on the hose.

In other embodiments, the cooling system may include any other quick release connect/disconnect mechanism.

According to another aspect of the present invention, a refrigeration system driven by a vehicle's engine is used to cool drinking liquid such as water or other beverages. In one embodiment, the refrigeration system is the air conditioning system for the vehicle. In another embodiment, the refrigeration system comprises a compressor which is separate from the compressor of the vehicle's air conditioning system (if any), the compressor being driven by the vehicle's engine or by another means such as an electric motor. An embodiment of a drinking liquid cooling system for a vehicle is described below with reference to FIGS. 6 and 7, in which FIG. 6 shows the system installed in a vehicle, and FIG. 7 shows the cooling system in more detail.

Figure 6:
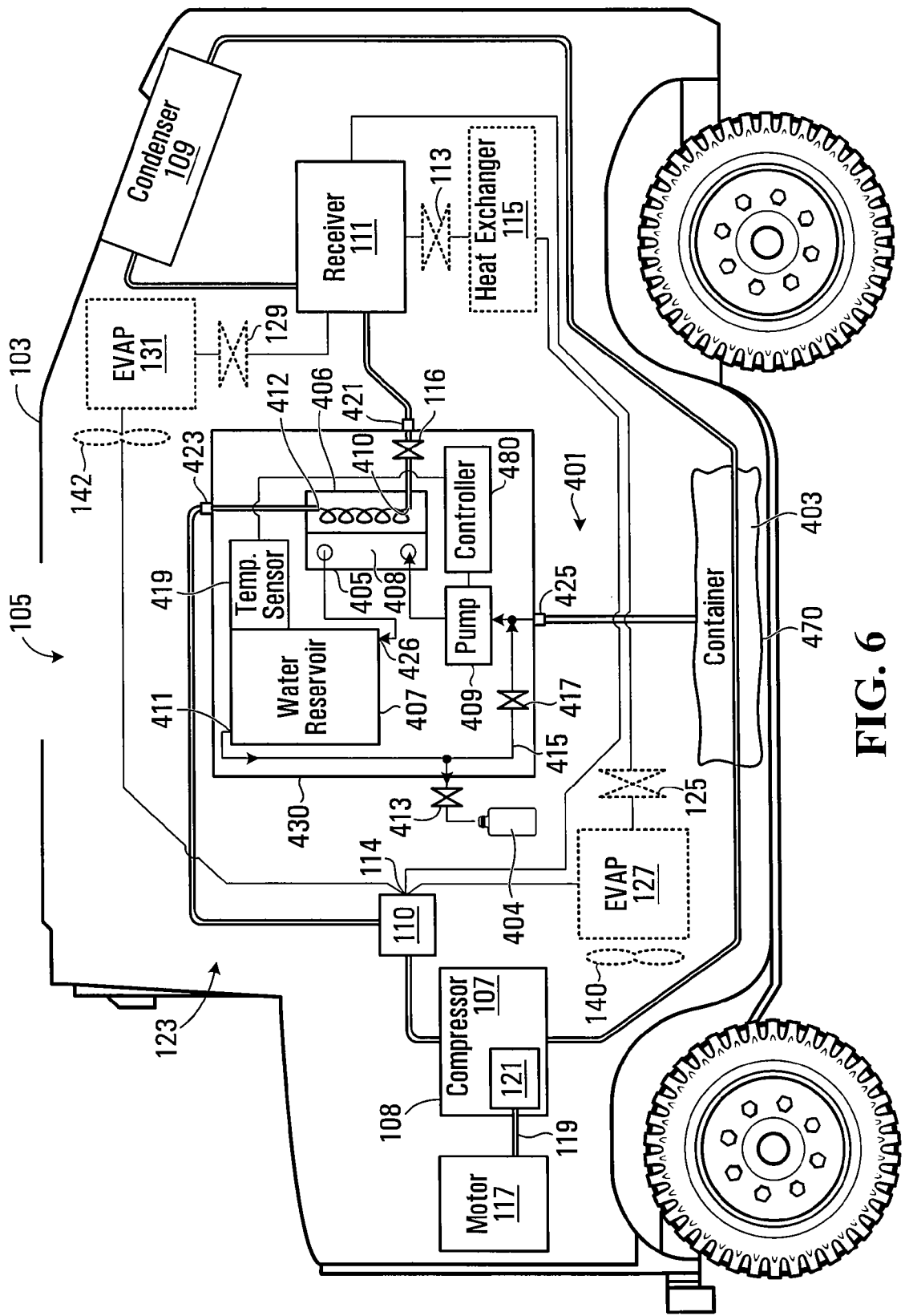
FIG. 6 shows a schematic diagram of a liquid supply system installed in a vehicle, in accordance with an embodiment of the present invention.
Figure 7:
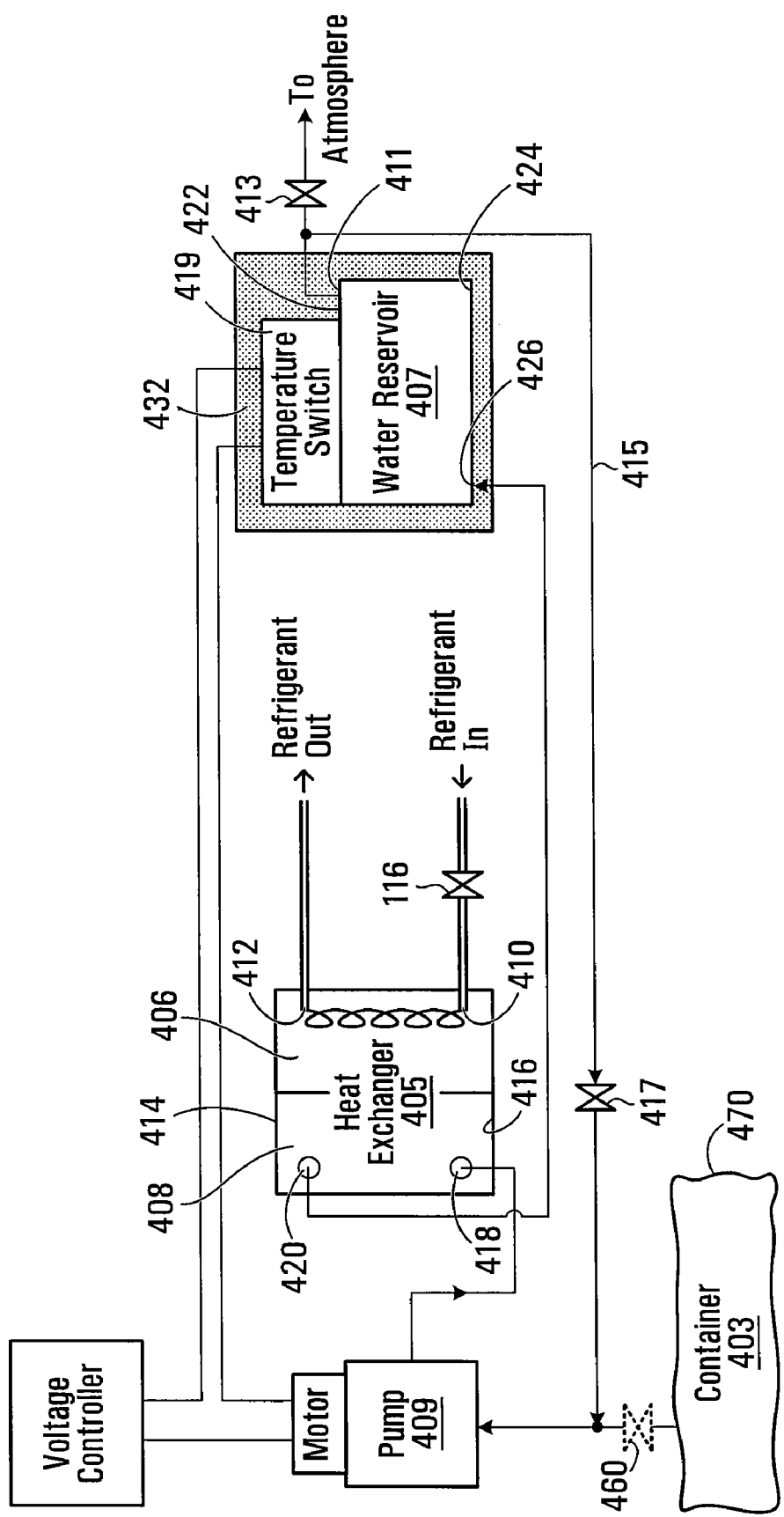
FIG. 7 shows a diagram of the liquid supply system shown in FIG. 6 in more detail.

Referring to FIGS. 6 and 7, the cooling system, generally shown at 401 comprises a storage container 403 for storing drinking liquid, a heat exchanger 405 for cooling liquid from the storage container, a reservoir 407 for receiving cooled liquid from the heat exchanger and a pump 409 for pumping liquid from the storage container 403 to the heat exchanger 405. The reservoir 407 includes an outlet 411 to which a dispensing valve 413 (e.g. tap or faucet) is connected to enable drinking liquid to be dispensed from the reservoir possibly into a suitable vessel 404, for example. A liquid return path 415 is provided for returning liquid from the reservoir to the heat exchanger, the return path including the pump 409 and a pressure responsive valve 417. A temperature sensor 419 is provided to monitor the temperature of the liquid in the reservoir, and a pump controller 480 is provided to control operation of the pump.

The heat exchanger includes an evaporator 406 which is connected in a refrigeration system and a means 408 defining a flow path for carrying drinking liquid in heat exchange relationship with the evaporator. The flow path may be defined by one or more conduit(s), one or more chambers or any other suitable means.

In this embodiment, the refrigeration system includes a compressor 107 for compressing refrigerant and which is coupled to be driven by the motor or engine 117 of the vehicle, a condenser 109 connected to the output of the compressor, an optional receiver 111 for receiving refrigerant from the condenser and an expansion device 116 coupled to the input 410 of the evaporator 406 for expanding refrigerant. The outlet 412 of the evaporator 406 is coupled to the input of the compressor 107 via an optional accumulator 110. Thus, the refrigeration system is similar to that described above in connection with the embodiment of FIG. 2.

To charge the reservoir 407 with drinkable liquid, the pump is activated to draw liquid from the storage container 403 through the heat exchanger 405, for cooling with refrigerant in the evaporator, and from the heat exchanger to the reservoir. The valve 413 at the outlet of the reservoir may be opened to allow any air in the liquid flow path to be purged or bled from the system. The valve 417 in the return path, which only opens above a predetermined pressure, prevents air discharged from the reservoir from being returned to the inlet of the pump 409. In one embodiment, the predetermined pressure is 7 PSI, although the valve cracking pressure may have any other value. Once air has been bled from the system, the valve 413 may be closed.

In this embodiment, the pump controller is adapted to control the pump to circulate the liquid between the reservoir and heat exchanger via the return path 415 to lower the temperature of the liquid below that resulting from a first pass through the heat exchanger. In one embodiment, the temperature sensor 419 comprises a temperature sensitive switch which on/off controls electrical power to the pump. When the temperature of the reservoir is above a predetermined temperature, the switch turns the pump on to circulate liquid between the reservoir and the heat exchanger to cool the liquid. Once the temperature of the liquid falls below a predetermined value, the switch turns the pump off.

In another embodiment, the temperature sensor 419 provides an indication of the temperature of the liquid in the reservoir and provides this information to the pump controller. The pump controller is adapted to compare the sensed temperature with a predetermined value and to operate the pump until the predetermined temperature is reached. If at that point, no liquid is being dispensed from the reservoir, the pump controller switches the pump off.

When there is no demand for drinking liquid, and the ambient temperature outside the reservoir is above the reservoir temperature, heat from the ambient may be transferred into the reservoir and the temperature of the reservoir increased. The switch or pump controller is adapted to operate the pump when the temperature of liquid in the reservoir reaches or exceeds a predetermined value to circulate liquid in the reservoir back through the heat exchanger to re-cool the liquid. Again, once the reservoir temperature reaches or falls below a predetermined value, the switch or pump controller switches the pump off. This process may be repeated, as often as necessary, so that the temperature of liquid in the reservoir is maintained at a desired value.

In this embodiment, the pressure sensitive valve 417 in the return path operates to select the source of liquid at the inlet of the pump between the storage container and the reservoir. Typically, when the pressure drop across the valve 417 is less than the cracking pressure of the valve 417, liquid will be drawn from the storage container 403. On the other hand, when the pressure drop across the valve is greater than the cracking pressure of the valve (e.g. 7 PSI) liquid will be drawn from the return path in preference to the storage container provided that the suction required draw water from the storage container subtracted from the pressure at the valve inlet is less than the valve cracking pressure, which can readily be implemented with the appropriate design. In other words, if the suction pressure required to draw liquid from the storage container is greater than that required to draw liquid from the return path, then liquid will be drawn preferentially from the return path. In other embodiments, an optional valve 460 may be provided between the storage container and the inlet of the pump to control the flow of liquid from the storage container.

The volume of the reservoir for holding drinking liquid may be any suitable size, for example from 0.5 to 1 liter or more. If more drinking liquid than can be held in the reservoir is required in a single dispensing session, the additional liquid will be drawn from the storage container, passed through the heat exchanger into the reservoir and dispensed through the valve 413. In this case, the liquid dispensed from the valve only passes through the heat exchanger once and therefore may be at an elevated temperature relative to the liquid initially drawn from the reservoir. However, the system can be designed so that liquid which makes a single pass through the heat exchanger is cooled to a beneficial temperature, for example, to a temperature where the liquid is more palatable, therapeutic or more easily absorbed by the body.

Table 1 below shows an example of test results of an exemplary embodiment in cooling liquid in successive passes or cycles through the heat exchanger. These results are for the purpose of illustration only and are in no way limiting of the invention.

| Pass No. | Temperature | Time |
| --- | --- | --- |
| Water in at | 140° F. | |
| After Pass 1 | 125° F. | (10 seconds) |
| After Pass 2 | 111° F. | (20 seconds) |
| After Pass 3 | 98° F. | (30 seconds) |
| After Pass 4 | 86° F. | (40 seconds) |
| After Pass 5 | 75° F. | (50 seconds) |
| After Pass 6 | 68° F. | (60 seconds) |
| After Pass 7 | 65° F. | (70 seconds) |

In other embodiments, the heat exchanger may be sized and/or operated to provide sufficient cooling power to cool liquid to the desired temperature on a single pass therethrough in which case the reservoir could be omitted. This may be achieved by any one or more of sizing the evaporator appropriately, controlling the flow of refrigerant, controlling the impedance of the expansion device 116, and/or providing a flow path for carrying liquid through the heat exchanger so that the liquid passes a plurality of times in heat exchange relationship with the evaporator before being discharged from the heat exchanger. However, arrangements which provide sufficient cooling on a single pass through the heat exchanger may require more power from the refrigeration system, which may also be required for other purposes, such as air conditioning and/or microclimate cooling. In this case the effectiveness of these other applications may be compromised while drinking liquid is being dispensed. Advantageously, the use of a reservoir and liquid return path enables the liquid to be cooled to the desired temperature while reducing the cooling power required, by allowing the liquid to be circulated through the heat exchanger a number of times to achieve the required temperature.

Some embodiments may be designed to chill 1 liter of water from 140° F. (60° C.) to 66° F. (19° C.) in about 120 seconds, as indicated in the Table. The system may be designed to provide a flow rate of 3 liters/minute, for example, or any other desired flow rate.

Referring again to FIGS. 6 and 7, in this embodiment, the storage container 403 has a variable volume so that the volume of the container decreases as liquid is drawn therefrom. Advantageously, this obviates the need to replace the liquid with air, which could be the case if the container had a fixed volume, thereby removing conditions which could promote bacterial growth. In the embodiment shown in FIGS. 6 and 7, the variable volume container has a flexible wall 470 made from any suitable material, such as HDPE (high density polyethylene). In other embodiments, the variable volume storage container may comprise a bellows or piston and cylinder type arrangement.

In some embodiments, the pump 409 comprises an electrically operated pump which can be driven by the vehicle's electrical power source. The pump may for example comprise a diaphragm-type pump so that the pumping chamber is effectively sealed against the ingress of contaminants or other matter through the pump displacement mechanism. Advantageously, the pump may be a self-priming pump to avoid the need for a priming mechanism.

As shown in FIGS. 6 and 7, the heat exchanger 405 includes a chamber 408 for receiving liquid, the chamber having a top 414 and bottom 416. The chamber has an inlet 418 (which may or may not be positioned near the bottom of the chamber) and outlet 420 for discharging liquid therefrom to the reservoir, the outlet being positioned adjacent the top 414 of the chamber. Advantageously, this arrangement assists in removing air from the chamber to prevent bacterial growth.

Similarly, the reservoir 407 includes an internal chamber having a top 422 and a bottom 424, a liquid inlet 426 (which may or may not be positioned near the bottom of the chamber), and a liquid outlet 411 positioned adjacent the top 422 of the reservoir. Again, arranging liquid to discharge from the top of the chamber assists in removing air from the reservoir.

In some embodiments, thermal insulating material and/or a thermal insulator 432 may be provided around the reservoir to assist in reducing heat transfer between the reservoir and the ambient. The thermal insulator may comprise a vacuum or depressurized space around the reservoir, for example.

In some embodiments, any one or more of the heat exchanger, reservoir, pump, controller and expansion device may be mounted as a single unit, possibly within a housing, for example housing 430 shown in FIG. 6. Referring to FIG. 6, releasable connectors 421, 423 may be provided to releasably couple the evaporator to the refrigeration system, and a releasable coupler 425 may be provided to releasably couple the pump to the drinking liquid storage container 403. The releasable couplers allow the liquid cooling unit to be connected to and disconnected from a vehicle, as required, so that the unit need only be installed when required, or can be easily removed for servicing or replacement in case of a fault or failure, for example.

In other embodiments, the storage container may be positioned above the dispensing outlet so that a head of drinking liquid provides the required pressure to supply liquid to the cooling system. In this case, the pump need only be required to circulate liquid between the reservoir and heat exchanger. In other embodiments, liquid in the storage container may be pressurized in order to supply liquid to the heat exchanger. This may be done by forming the container wall or part thereof with a stretchable or elastic material so that the walls exert pressure on the liquid when stretched. In another embodiment, the walls of the container may be subjected to an external pressure provided by any suitable means, such as the pressure of a surrounding fluid and/or exerted by a mass.

In another embodiment, separate pumps may be provided, one for drawing liquid from the storage container, and another for circulating liquid between the reservoir and heat exchanger. In other embodiments, one or more additional reservoirs may be provided for temporarily storing liquid cooled by the heat exchanger.

In some embodiments, the drinking liquid cooling system may be incorporated in a vehicle with other cooling systems such as an air conditioning system and/or a microclimate (e.g. localised) cooling system and/or a cooling system for cooling electronic equipment. In the embodiment of FIGS. 6 and 7, the vehicle includes one or more additional evaporators 127, 131 for an air conditioning system and one or more heat exchangers 115 for a microclimate cooling system. Each of these systems may be similar to those described above with reference to FIGS. 2 to 5, and like parts are designated by the same reference numerals. In other embodiments, the drinking liquid cooling system may be installed in a vehicle without an air conditioning system, microclimate system or other cooling system.

In other embodiments, the liquid cooling system may be provided with its own refrigeration system having a compressor which is driven by an electric motor. The electric motor may be powered from a vehicle's electrical power source or by any other suitable electrical power supply. An example of a liquid supply system having its own electrically operated refrigeration system is shown in FIG. 8.

Figure 8:
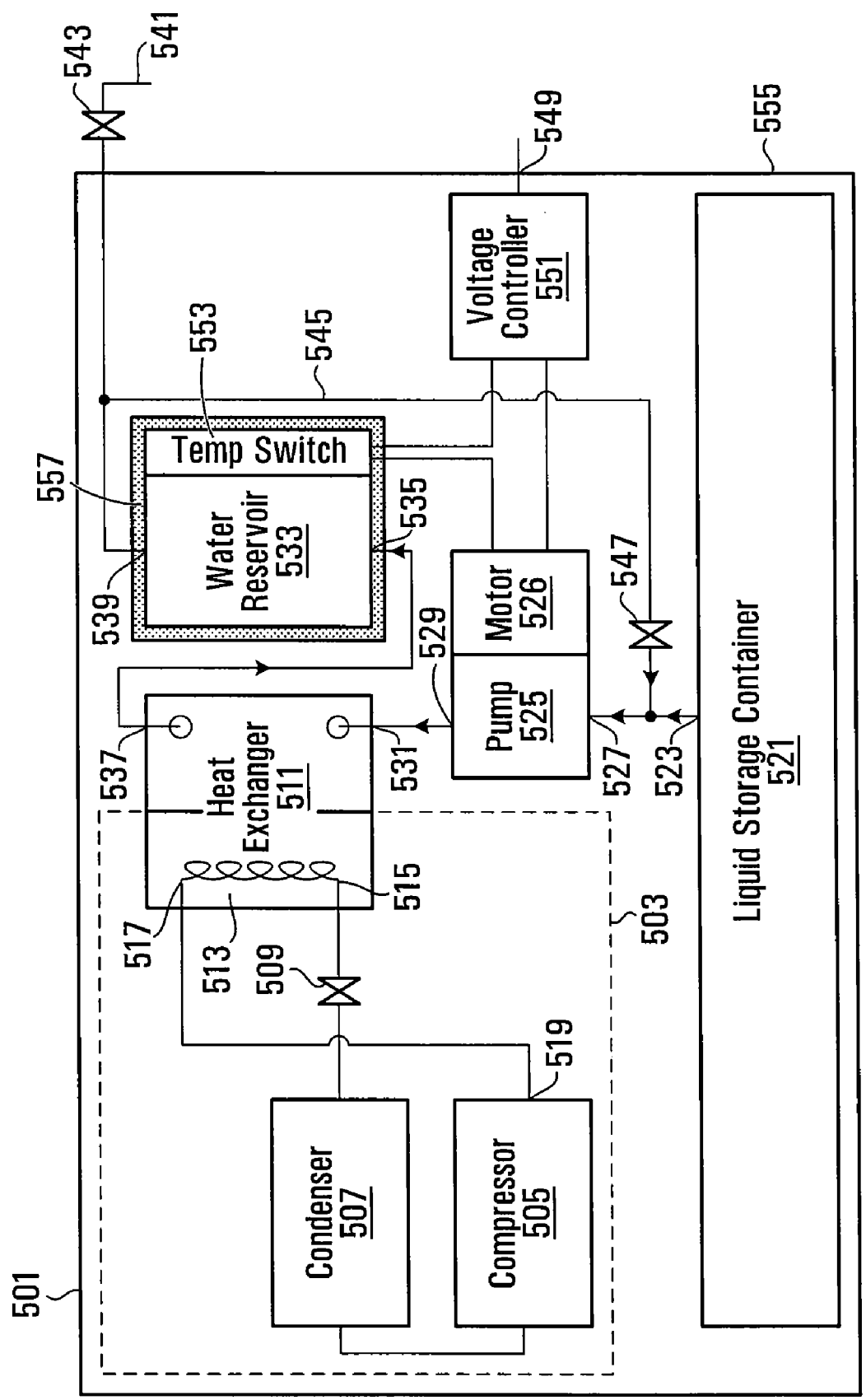
FIG. 8 shows a schematic diagram of a liquid cooling system according to another embodiment of the present invention.

Referring to FIG. 8, a liquid supply unit, generally shown at 501, comprises a refrigeration system 503 which includes a compressor 505 for compressing refrigerant, a condenser 507 for receiving and condensing high pressure refrigerant from the compressor 505, an expansion device 509 for expanding refrigerant from the condenser and a heat exchanger 511 which includes an evaporator 513 having an inlet 515 for receiving refrigerant from the expansion device 509, and an outlet 517 coupled to the inlet 519 of the compressor 505. The liquid supply system further comprises a liquid storage container 521 having an outlet 523, a pump 525 having a pump inlet 527 coupled to the outlet 523 of the storage container, and a pump outlet 529 coupled to a liquid inlet 531 of the heat exchanger 511, and a reservoir 533 having an inlet 535 connected to the liquid outlet 537 of the heat exchanger 511. The reservoir 533 has an outlet 539 connected to a fluid dispensing port 541 via a dispensing control valve 543. The liquid supply system also includes a return path 545 for returning liquid from the reservoir to the inlet 527 of the pump 525, and in this embodiment the return path includes a pressure responsive valve 547. The liquid supply system also includes an electrical connector 549 for connecting the system to a suitable electrical power source, a voltage controller 551 for controlling the voltage for driving the pump motor 526 and a temperature responsive switch 553 for on/off controlling the motor in response to the temperature of the reservoir 533. In other embodiments, operation of the pump may be controlled using any other suitable sensed parameter.

Any one or more components of the liquid supply system may be housed within a housing or casing 555. Although in the embodiment of FIG. 8, the liquid storage container is housed within the housing 555, in other embodiments, the liquid storage container may be external of the housing, and may be releasably connectable to the pump inlet and optionally also to the housing 555.

The liquid supply system may operate in a similar manner to that described above with reference to FIGS. 6 and 7. In particular, liquid is drawn from the liquid storage container via the pump 525 and is cooled in the heat exchanger by refrigerant flowing through the evaporator. The cooled liquid is supplied to the reservoir 553 to provide a supply of cooled liquid which can be dispensed through the dispensing port 541. Liquid from the reservoir may be recirculated through the heat exchanger for additional cooling thereof via the return path 545 under the control of the pump and temperature responsive switch 553. The unit may be connected to any suitable electrical power supply, for example a power supply of a vehicle, a temporarily deployed ground based power supply, a local electricity generator, or the electrical grid. Components of the liquid supply system shown in FIG. 8 may have any one or more of the features of the corresponding components described above in connection with the embodiment of FIGS. 6 and 7. For example, the liquid storage container may comprise a variable volume storage container whose volume decreases as liquid is drawn therefrom, the pump may comprise a diaphragm-type pump and/or the reservoir may be arranged to reduce heat transfer between the reservoir and external environment. For example, the reservoir chamber may be surrounded by a vacuum and/or thermal insulating material 557. Advantageously, the unit can be portable and readily connected to a suitable electrical supply system.

Figure 9:
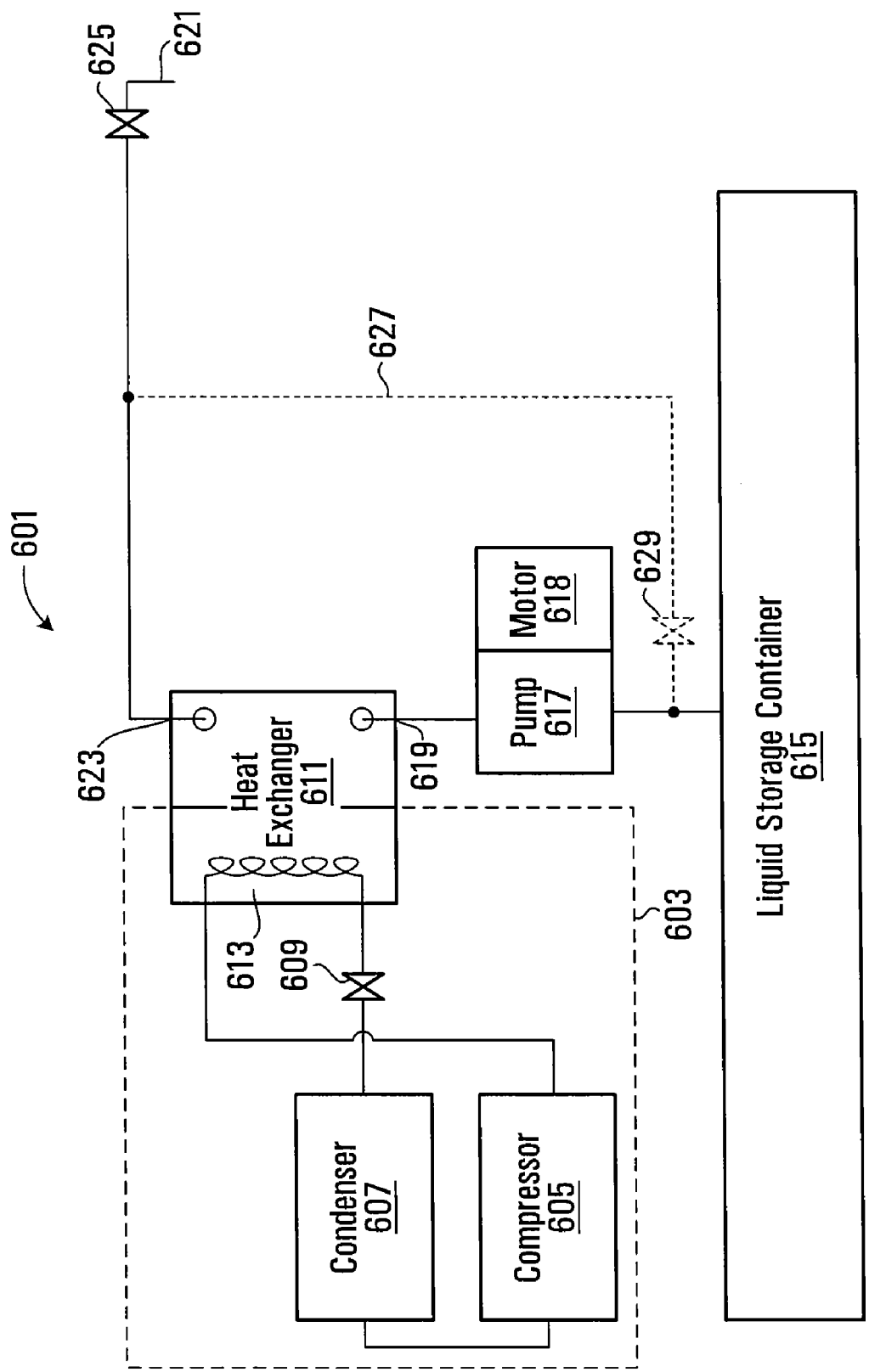
FIG. 9 shows a schematic diagram of a liquid cooling system according to another embodiment of the present invention.

FIG. 9 shows another embodiment of a liquid supply system. The liquid supply system 601 comprises a refrigeration system 603 which includes a compressor 605, a condenser 607, an expansion device 609 and a heat exchanger 611 which includes an evaporator 613. The liquid supply system also includes a liquid storage container 615, a pump 617 for drawing liquid from the storage container 615 and for supplying the liquid to a liquid inlet port 619 of the heat exchanger 611. A liquid dispensing port 621 is connected to the liquid outlet port 623 of the heat exchanger 611 via a dispensing control valve 625. In the simplified arrangement, in which a reservoir for receiving cooled liquid from the heat exchanger is omitted, liquid is drawn from the storage container by the pump, is passed through the heat exchanger where the liquid is cooled by refrigerant in the evaporator 613 and is dispensed through the dispensing port 621. An optional return path 627 may be provided for returning liquid from the outlet 623 of the heat exchanger to the inlet 619 thereof via the pump 617. An optional pressure sensitive valve 629 may be included in the return path 627 for controlling the source of liquid to the inlet of the pump 617 as between the liquid storage container and the return path. The system may be arranged so that liquid is or can be circulated through the heat exchanger a plurality of times before being dispensed through the dispensing port 621.

In some embodiments, the compressor 605 may be driven by the engine of a vehicle. The compressor has a fluid displacer which, in this case, may be coupled to an output drive of the engine. In other embodiments, the compressor 605 may be driven by an electric motor, connected, for example, to a vehicle's electrical power system. The compressor 605 may provide refrigerant for a vehicle's air conditioning system and/or other cooling application, or may comprise a separate compressor from that used to drive a vehicle's air conditioning system. In one embodiment, the compressor may comprise a dedicated compressor implemented only for supplying cool liquid.

Figure 10:
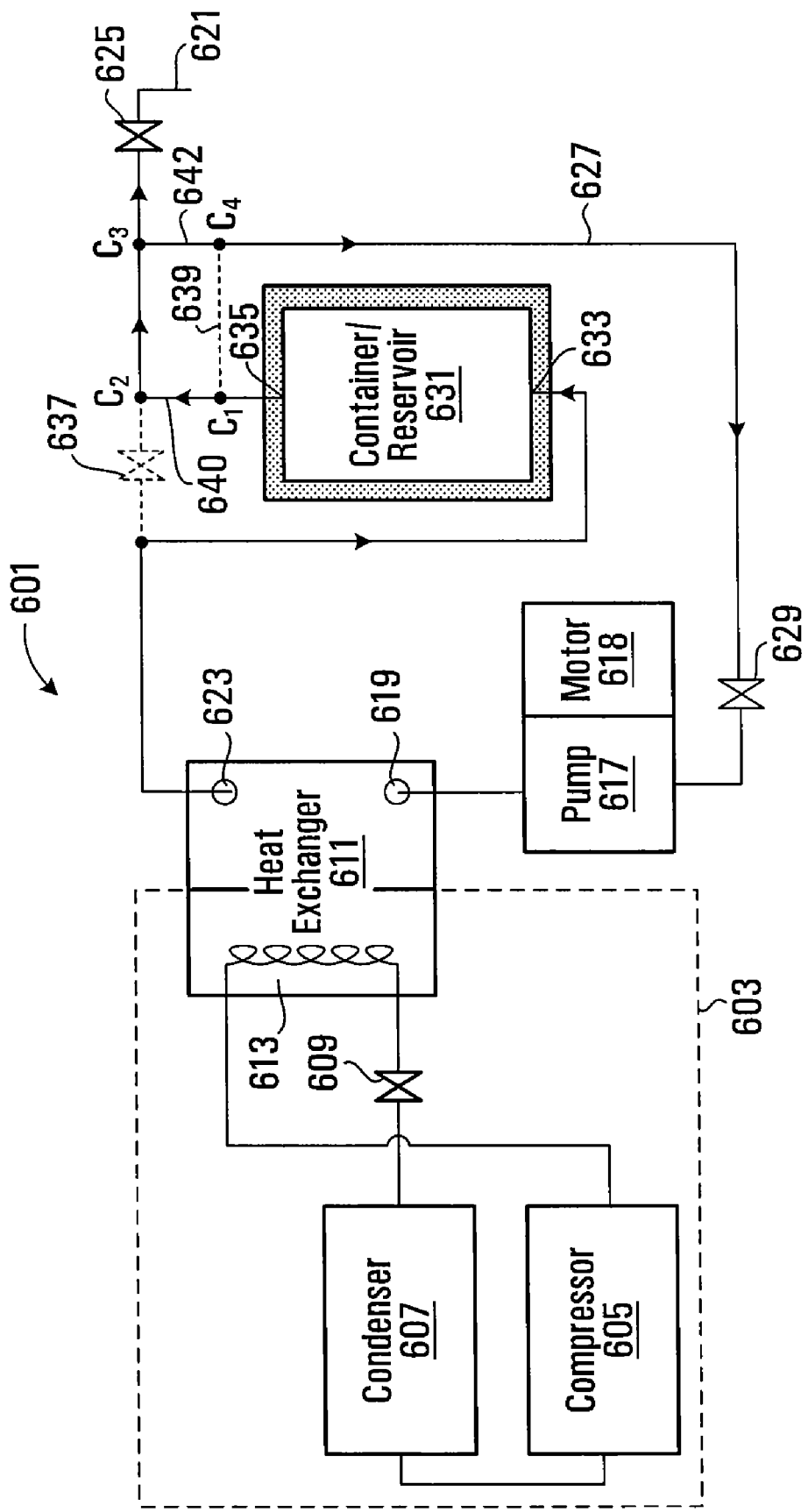
FIG. 10 shows a schematic diagram of a liquid supply system according to another embodiment of the present invention.

Another embodiment of a liquid supply system comprises a liquid cooling system and a reservoir for storing liquid where the reservoir constitutes the primary storage vessel and source of cool liquid. The system may be arranged to circulate liquid between the reservoir and the cooling system. An example of such an embodiment is shown in FIG. 10. The embodiment of FIG. 10 is similar in some respects to the embodiment of FIG. 9, and like parts are designated by the same reference numerals.

Referring to FIG. 10, the liquid supply system 601 comprises a refrigeration system 603, which includes a compressor 605, a condenser 607, an expansion device 609 and a heat exchanger 611, which includes an evaporator 613. The liquid supply system also includes a liquid storage container or reservoir 631 having liquid inlet and outlet ports 633, 635. The liquid outlet port 635 is connected to the liquid inlet port 619 of the heat exchanger via a pump 617. The liquid outlet port 623 of the heat exchanger is connected to the liquid inlet port 633 of the reservoir 631. In one embodiment, the outlet port 635 of the reservoir 631 is connected to the dispensing outlet port 621 via the control valve 625. In operation, liquid is circulated from the reservoir 631 through the heat exchanger 611, where the liquid is cooled and the liquid is subsequently returned to the reservoir. The pump may be operated to circulate liquid between the reservoir and heat exchanger until the temperature of liquid in the reservoir reaches the required value, at which point the pump may be switched off. Operation of the pump may be controlled by a temperature sensitive switch which is responsive to the temperature of liquid in the reservoir or in another part of the circuit or by another suitable controller. Cool liquid may be dispensed through the dispensing port 621 via the outlet port 635 of the reservoir and the dispensing valve 625.

In a first variant, the liquid dispensing port 621 and the dispensing valve 625 may be connected to the outlet port 623 of the heat exchanger via a control valve 637. The control valve 637 is operative to enable liquid to be dispensed either from the reservoir outlet port 635, or the heat exchanger outlet port 623.

In a second variant, the dispensing port 621 and dispensing valve 625 are not connected to the outlet port 635 of the reservoir, but only to the outlet port 623 of the heat exchanger. In this case, the outlet port 635 of the reservoir is only connected to the inlet port 619 of the heat exchanger via the pump 617, as shown by the broken line path 639. In this case line section 640, between points C1 and C2, and line section 642 between points C3 and C4 would not carry liquid from the reservoir and may be disabled if present, or omitted. The dispensing valve 625 is operative to dispense liquid directly from the outlet of the heat exchanger 623 when the valve is open, and to cause liquid from the outlet 623 of the heat exchanger to flow to the inlet 633 of the reservoir, when the dispensing valve 625 is closed. Thus, in this embodiment, liquid supplied to the dispensing port 621 is always derived from the outlet of the heat exchanger rather than the reservoir 631.

The reservoir may comprise a variable volume vessel whose volume varies with the amount of liquid contained therein so that as liquid is consumed, the internal volume of the reservoir decreases accordingly. As for the other embodiments, this arrangement obviates the need to replace the volume of liquid removed from the reservoir with some other fluid, for example air, which could cause bacterial growth in the reservoir.

In some embodiments, a thermal insulator or insulating material may be provided around the reservoir to thermally insulate the reservoir from the ambient and so that the liquid can remain cool for longer periods of time.

The compressor 605 may be driven by an output drive of the engine or motor of a vehicle, or may be driven by a separate motor, for example an electric motor. The electric motor may be driven from a vehicle's electrical power source.

Figure 11:
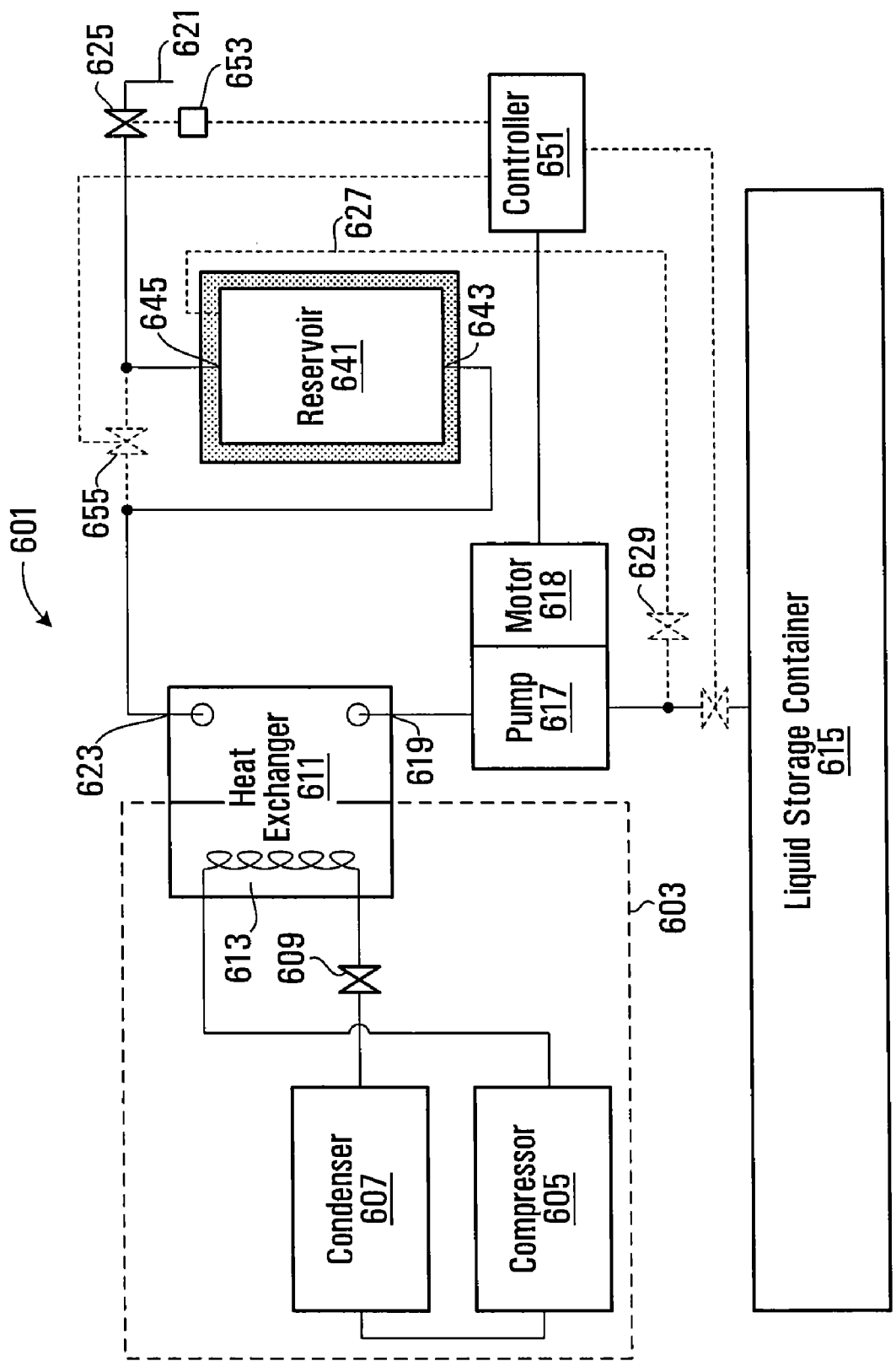
FIG. 11 shows a schematic diagram of a liquid supply system according to another embodiment of the present invention.

FIG. 11 shows another embodiment of an apparatus for supplying and dispensing liquid. The apparatus is similar in some respects to that shown in FIG. 9, and like parts are designated by the same reference numerals. The embodiment of FIG. 11 includes a reservoir 641 for storing liquid and which has an inlet 643 connected to the outlet 623 of the heat exchanger 611. The dispensing valve 625 is connected to an outlet 645 of the reservoir 641. A controller 651 is provided for controlling the flow rate of liquid through the heat exchanger. In one embodiment, the controller is adapted to vary the flow rate of liquid through the heat exchanger depending on the status of the dispensing valve in enabling liquid to be dispensed therefrom. For example, when the dispensing valve is closed, the controller may allow liquid to flow through the heat exchanger into the reservoir 641 and when the dispensing valve is open to allow the liquid to flow through the heat exchanger at a higher rate than when the dispensing valve is closed. In this manner, when there is no demand for liquid and the dispensing valve is closed, liquid may be passed more slowly through the heat exchanger to prolong its dwell time in the heat exchanger and thereby increase the amount of cooling and decrease its temperature at the exit of the heat exchanger. On the other hand, when there is a demand for liquid and the dispensing valve is open, the controller may be adapted to cause liquid to flow at a faster rate through the heat exchanger to allow liquid to be dispensed at a required or desired flow rate.

The controller may control the flow rate through the heat exchanger by any suitable means, including controlling the speed of the pump 617, for example by controlling the speed of the motor 618 (e.g. by controlling the electrical power thereto) and/or by controlling a restriction anywhere in the liquid path between the liquid storage container 615 and the dispensing valve 625. The storage container may comprise a variable volume storage container whose internal volume for receiving liquid expands and contracts depending on the liquid volume, so that the liquid is not contacted by air. The controller 651 may be responsive to a sensor or switch 653 which provides an indication of the open/closed state of the dispensing valve. The controller 651 or another controller (not shown) may be adapted to control an optional bypass valve 655 which allows liquid from the heat exchanger to bypass the reservoir 641. For example, the controller may control the bypass valve 655 so that liquid can flow directly from the heat exchanger through the dispensing valve 625 under certain conditions which may or may not be predetermined conditions.

An optional return path 627 may be provided between the reservoir 641 and the inlet to the pump 617, and the return path may include an optional valve 629 for controlling the flow of liquid through the return path.

In any of the embodiments described above or disclosed herein, a means may be provided for on/off controlling the pump in response to a demand for liquid to be dispensed. This may be implemented by any suitable means, non-limiting examples of which include a pressure switch that detects a reduction in liquid pressure when the dispensing valve is open, and a switch responsive to the state, e.g. position of the dispensing valve (closed or open). The dispensing valve may comprise any suitable valve, for example a manually activated ball valve or a solenoid or other electrically operated valve activated by, for example, a push button switch or another device. The push button or other device may be used also to turn on/off the pump.

In any of the embodiments described above, a pump for pumping liquid through the heat exchanger may be controlled to operate in response to an indication that the dispensing valve is open.

In any of the embodiments described above, the cool liquid may comprise a drinkable liquid, such as water or other consumable beverage or may comprise any other liquid.

In any aspect or embodiment of the invention disclosed herein, any one or more features may be omitted altogether or substituted by another feature which may or may not be an equivalent or variant thereof.

In another embodiment, the same heat exchanger may be adapted to cool fluids from a plurality of sources and/or for a plurality of end uses or systems. For example, the heat exchanger may include an evaporator for carrying refrigerant, in which the evaporator is arranged to exchange heat with liquids for two or more systems (e.g. for a localised climate condition system and a drinking liquid dispensing system) and/or with a liquid of one system, (e.g. liquid for a localised climate conditioning system, or drinking liquid), and/or a fluid for another system (e.g. air for an air conditioning system). In one embodiment, a conduit for carrying liquid may be enclosed within the evaporator and an air flow caused to flow adjacent the outer surface of the evaporator, or vice versa. Any other configuration may be used to enable the evaporator to cool a plurality of fluids simultaneously or successively. Such an arrangement obviates the need for an evaporator for each fluid and may enable the space required for the system to be reduced.

Other embodiments and aspects of the invention comprise any component disclosed herein in combination with any one or more other components disclosed herein.

Numerous modifications and changes to the embodiments disclosed herein will be apparent to those skilled in the art.

We claim:

1. An apparatus comprising:
   a compressor for compressing refrigerant, said compressor driven by a power source installed in a vehicle; a condenser for receiving compressed refrigerant from the compressor; an expansion device for expanding refrigerant from the condenser; a heat exchanger for receiving refrigerant from said expansion device and for exchanging heat between said refrigerant and a liquid; a supply for supplying liquid to said heat exchanger for exchanging heat with said refrigerant; a reservoir for receiving liquid from said heat exchanger; a return path for returning liquid from said reservoir to said heat exchanger for heat exchange with said refrigerant; a pump coupled between an outlet of said reservoir and an inlet of said heat exchanger; and a controller for controlling said pump; said supply having an outlet coupled between said outlet of said reservoir and said pump;
   wherein said controller is adapted to control said pump based on one or more of (i) a parameter indicative of temperature of said liquid, (ii) a parameter indicative of the temperature of said liquid in said reservoir, (iii) a parameter indicative of the pressure of said liquid, (iv) the state of a switch for supplying power to said pump, (v) an indication of whether a dispensing valve is open or closed, (vi) the present time and (vii) a time period that the pump has been active or inactive.

2. An apparatus as claimed in claim 1, wherein said heat exchanger comprises an evaporator for receiving refrigerant from said expansion device and a conduit adjacent said evaporator for carrying said liquid.

3. An apparatus as claimed in claim 1, wherein said heat exchanger comprises a liquid-to-liquid heat exchanger.

4. An apparatus as claimed in claim 1, wherein said heat exchanger comprises a membrane for transferring heat between said liquid and said refrigerant, said membrane having opposed surfaces, one of said surfaces for contacting said refrigerant, and the other of said surfaces for contacting said liquid.

5. An apparatus as claimed in claim 2, wherein said heat exchanger comprises a supply for supplying liquid to be cooled by said refrigerant adjacent said evaporator.

6. An apparatus as claimed in claim 1, wherein said compressor at least one of (i) is mechanically coupled to an output drive of an engine of a vehicle, (ii) has a displacer for compressing said refrigerant, said displacer being mechanically coupled to an output drive of an engine of a vehicle, (iii) has a driveshaft for receiving mechanical energy to drive said compressor, said driveshaft being mechanically coupled to an output drive of an engine of said vehicle, and (iv) is coupled to be driven by an electric motor adapted for connection to said power source.

7. An apparatus as claimed in claim 6, wherein said electric motor is adapted for receiving electrical power from at least one of (i) an electrical generator driven by an engine of a vehicle and (ii) an apparatus for storing electrical energy.

8. An apparatus as claimed in claim 1, wherein said heat exchanger has one or more an outlet port(s) for supplying liquid therefrom.

9. An apparatus as claimed in claim 8, further comprising a respective connector associated with one or more outlet port(s) for releasably connecting the outlet port to a device for receiving liquid from said heat exchanger.

10. An apparatus as claimed in claim 1 further comprising one or more further heat exchangers coupled to receive liquid from said heat exchanger.

11. An apparatus as claimed in claim 1, wherein said heat exchanger further comprises one or more inlet port(s) for introducing liquid to said heat exchanger.

12. An apparatus as claimed in claim 1, wherein said heat exchanger comprises a plurality of inlet ports and said pump has an inlet for receiving liquid from plurality of inlet ports and an outlet connected to an inlet of said heat exchanger.

13. An apparatus as claimed in claim 1, further comprising another heat exchanger having an evaporator for receiving refrigerant and arranged for exchanging heat between said refrigerant and air.

14. An apparatus as claimed in claim 13, wherein the refrigerant for said other heat exchanger is supplied by said compressor.

15. An apparatus as claimed in claim 13, wherein the refrigerant for said other heat exchanger is supplied from said condenser.

16. An apparatus as claimed in claim 13, further comprising a receiver between said condenser and said expansion device for receiving refrigerant from said condenser, and wherein refrigerant for said other heat exchanger is supplied from said receiver.

17. An apparatus as claimed in claim 13, further comprising a fluid impeller for providing a flow of air in heat exchange relationship with refrigerant in said other heat exchanger.

18. An apparatus as claimed in claim 1, wherein said supply comprises one or more storage container(s) for storing said liquid.

19. An apparatus as claimed in claim 18, wherein said supply is adapted to produce a flow of liquid through said heat exchanger in heat exchange with said refrigerant.

20. An apparatus as claimed in claim 18, wherein said reservoir is smaller than the maximum total volume of said storage container(s).

21. An apparatus as claimed in claim 1, further comprising a valve for dispensing liquid from said reservoir.

22. An apparatus as claimed in claim 1, wherein at least one of (i) said controller is adapted for varying the speed of the pump between two or more different speeds, each speeding causing liquid to flow, and (ii) said controller is adapted to control the speed of the pump between different speeds each causing fluid to flow, in response to a parameter.

23. An apparatus as claimed in claim 22, wherein said controller is adapted to operate said pump to cause liquid to flow from said reservoir through said heat exchanger and back to said reservoir when the temperature of said reservoir is above a predetermined value and to cease operation of said pump when the temperature of liquid in said reservoir reaches or falls below a predetermined value.

24. An apparatus as claimed in claim 1, wherein said controller comprises a valve positioned between an outlet of said reservoir and the inlet of said pump, wherein said valve is adapted to close below a predetermined pressure and open above a predetermined pressure.

25. An apparatus as claimed in claim 1, further comprising a thermal insulator surrounding said reservoir.

26. An apparatus as claimed in claim 1, wherein said liquid comprises at least one of a coolant and a drinkable liquid.

27. An apparatus as claimed in claim 9, wherein one or more connector(s) is adapted to release on application of a tensile force applied thereto above a determined value.

28. An apparatus as claimed in claim 1, comprising a further compressor for compressing refrigerant and arranged to supply said refrigerant for use in at least one of an air conditioning system, and another system.

29. An apparatus as claimed in claim 28, wherein said further compressor is coupled to be driven by a power source of a vehicle.

30. An apparatus as claimed in claim 28, wherein said air conditioning system comprises a condenser, an expansion device and an evaporator, one or more of which are separate from said condenser, said expansion device and said heat exchanger of said apparatus.

31. A method of heat exchange between fluids comprising the steps of: compressing refrigerant by means of a compressor driven from a power source of a vehicle; condensing said refrigerant from said compressor; exchanging heat by means of a heat exchanger between refrigerant from said compressor and a liquid that is in the liquid state before exchanging heat with said refrigerant supplying said liquid to one or more heat exchangers; receiving liquid from said heat exchanger by means of a reservoir; returning liquid from said reservoir to said heat exchanger for heat exchange with said refrigerant; providing a pump coupled between an outlet of said reservoir and an inlet of said heat exchanger; and controlling said pump by means of a controller; providing a supply having an outlet coupled between said outlet of said reservoir and said pump;
wherein said controller is adapted to control said pump based on one or more of (i) a parameter indicative of temperature of said liquid, (ii) a parameter indicative of the temperature of said liquid in said reservoir, (iii) a parameter indicative of the pressure of said liquid, (iv) the state of a switch for supplying power to said pump, (v) an indication of whether a dispensing valve is open or closed, (vi) the present time and (vii) a time period that the pump has been active or inactive.

32. A method as claimed in claim 31, wherein the step of exchanging heat between said refrigerant and a liquid comprises expanding said refrigerant and passing said refrigerant through an evaporator.

33. A method as claimed in claim 31, further comprising passing a portion of said refrigerant to a heat exchanger for exchanging heat between said refrigerant and air.

34. A method as claimed in claim 33, further comprising the step of providing a flow of air through said heat exchanger.

35. A method as claimed in claim 31, wherein the liquid comprises a drinkable liquid.

36. A method as claimed in claim 31, further comprising returning liquid for heat exchange with said refrigerant one or more further times after a first heat exchange between said refrigerant and said liquid.

37. A method as claimed in claim 36, wherein the step of returning is performed until said liquid reaches a predetermined temperature.

38. A vehicle comprising a body having an interior space; a power source; a compressor for compressing refrigerant, said compressor being adapted to be driven by said power source and a heat exchanger having an evaporator arranged to pass said refrigerant adjacent a liquid for heat exchange therewith; a supply for supplying liquid to said heat exchanger for exchanging heat with said refrigerant; a reservoir for receiving liquid from said heat exchanger; a return path for returning liquid from said reservoir to said heat exchanger for heat exchange with said refrigerant; a pump coupled between an outlet of said reservoir and an inlet of said heat exchanger; and a controller for controlling said pump; said supply having an outlet coupled between said outlet of said reservoir and said pump;
wherein said controller is adapted to control said pump based on one or more of (i) a parameter indicative of temperature of said liquid, (ii) a parameter indicative of the temperature of said liquid in said reservoir, (iii) a parameter indicative of the pressure of said liquid, (iv) the state of a switch for supplying power to said pump, (v) an indication of whether a dispensing valve is open or closed, (vi) the present time and (vii) a time period that the pump has been active or inactive.

* * * * *